United States Patent
Shoji et al.

(10) Patent No.: US 7,557,982 B2
(45) Date of Patent: Jul. 7, 2009

(54) INFORMATION DISPLAY PANEL

(75) Inventors: Takanori Shoji, Higashimurayama (JP); Taichi Kobayashi, Kodaira (JP); Shinichi Kita, Saitama (JP)

(73) Assignee: Bridgestone Corporation, Tokyo (JP)

( * ) Notice: Subject to any disclaimer, the term of this patent is extended or adjusted under 35 U.S.C. 154(b) by 75 days.

(21) Appl. No.: 11/878,346

(22) Filed: Jul. 24, 2007

(65) Prior Publication Data

US 2008/0030843 A1 Feb. 7, 2008

(30) Foreign Application Priority Data

| Jul. 24, 2006 | (JP) | ............................. 2006-200684 |
| Sep. 22, 2006 | (JP) | ............................. 2006-257139 |
| Oct. 6, 2006 | (JP) | ............................. 2006-275226 |
| Jul. 20, 2007 | (JP) | ............................. 2007-189370 |

(51) Int. Cl.
*G02B 26/00* (2006.01)
*G09G 3/34* (2006.01)
(52) U.S. Cl. ...................................... 359/296; 345/107
(58) Field of Classification Search ................. 359/296; 345/107; 430/32; 204/600
See application file for complete search history.

(56) References Cited

U.S. PATENT DOCUMENTS 4,640,583 A * 2/1987 Hoshikawa et al. ......... 349/153

FOREIGN PATENT DOCUMENTS

| EP | 1 821 139 A1 | 8/2007 |
| WO | 2006/062155 A1 | 6/2006 |

\* cited by examiner

*Primary Examiner*—William C Choi
(74) *Attorney, Agent, or Firm*—Sughrue Mion, PLLC

(57) ABSTRACT

An information display panel wherein display media consists of at least one kind of particle and having optical reflectance and charging characteristics are sealed between two opposed substrates, at least one of which is transparent. The display media, to which an electrostatic field is applied, are made to move so as to display information. A member for securing a gap space is formed in the outer and inner peripheral sides of a sealing agent placement part provided in the outer edge portion of an display area of the panel. The member provided in the outer peripheral side is provided evenly in each side and densely in each corner portion. The member provided in the inner peripheral side is provided with chamfered corners in each corner portion, so that the member for securing the gap space does not contact to the sealing agent placement part.

14 Claims, 19 Drawing Sheets

FIG. 3
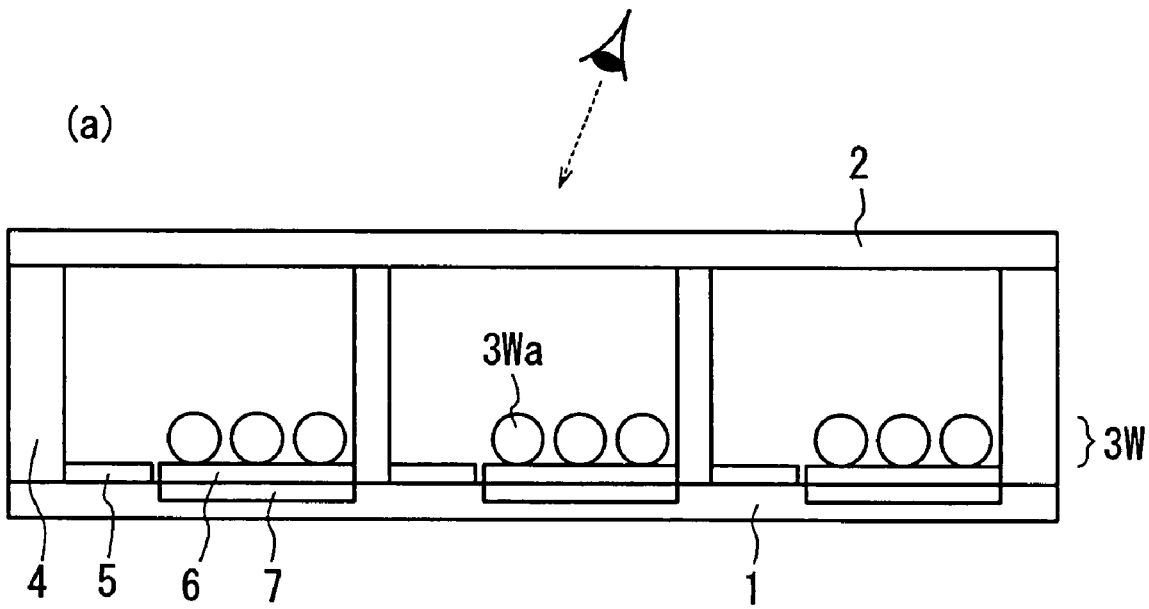
(a)
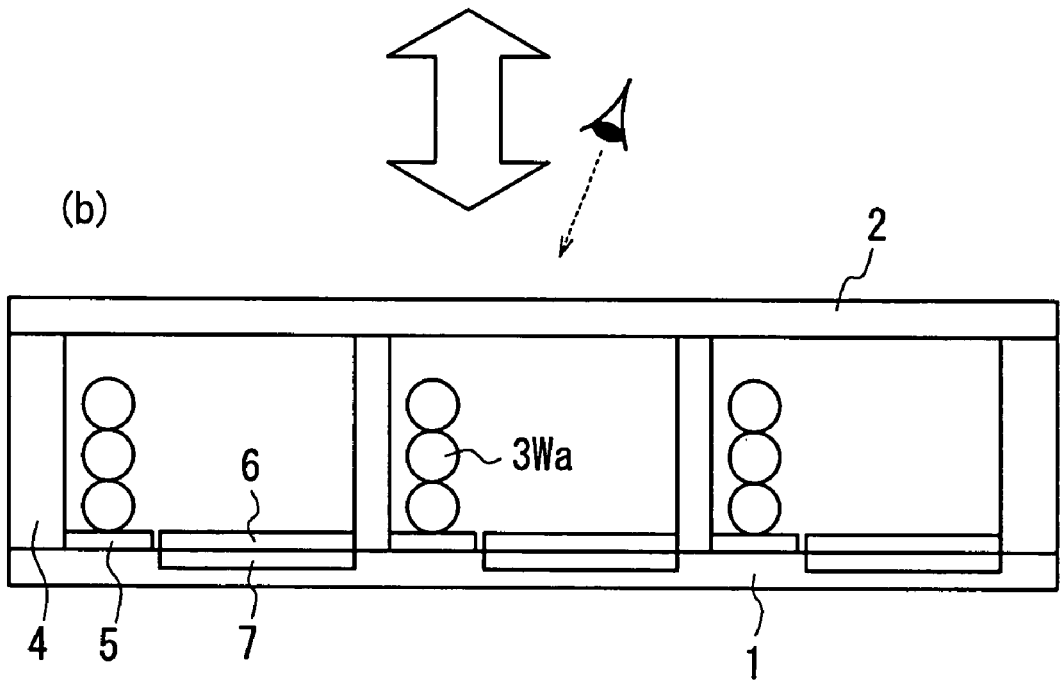
(b)

FIG. 8
PRIOR ART
(a)
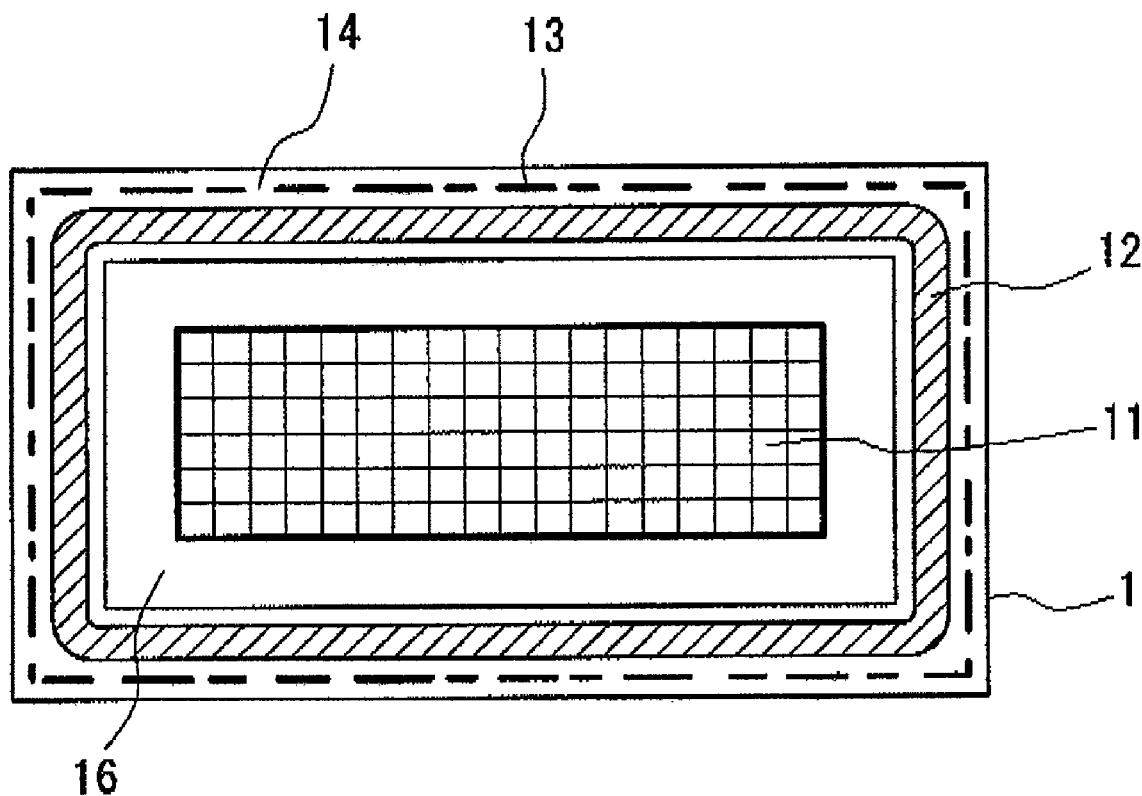
(b)
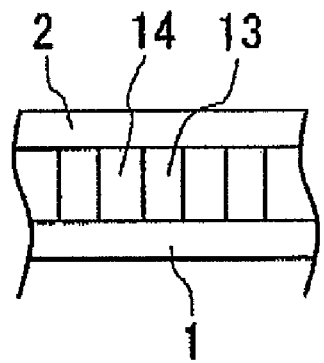

FIG. 10
(a)
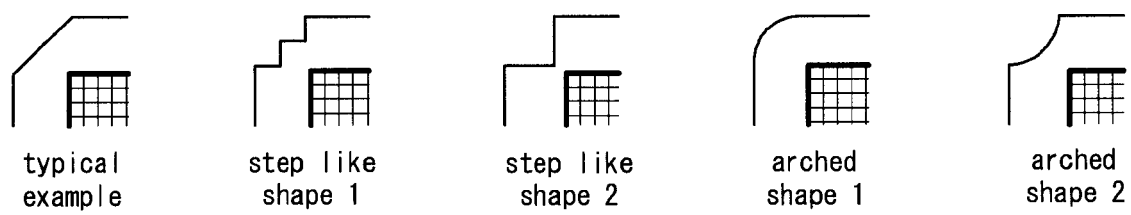
typical example | step like shape 1 | step like shape 2 | arched shape 1 | arched shape 2
(b)
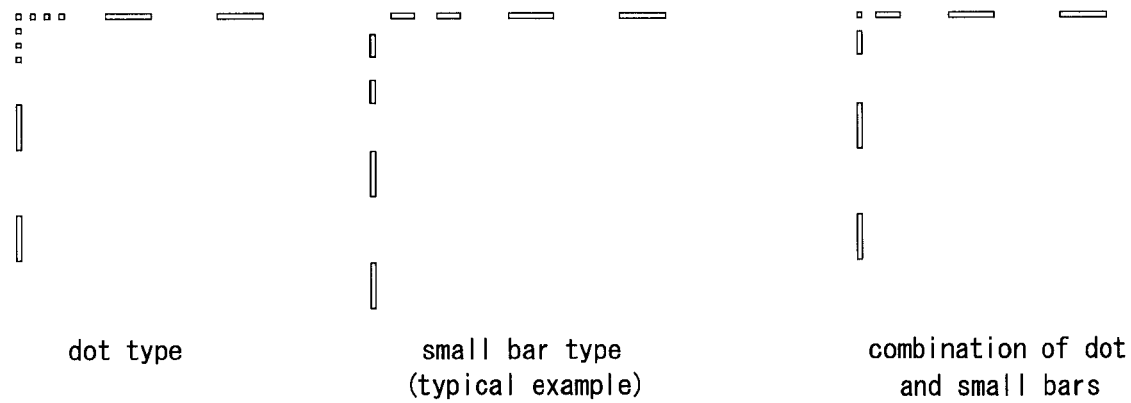
dot type | small bar type (typical example) | combination of dot and small bars FIG. 11
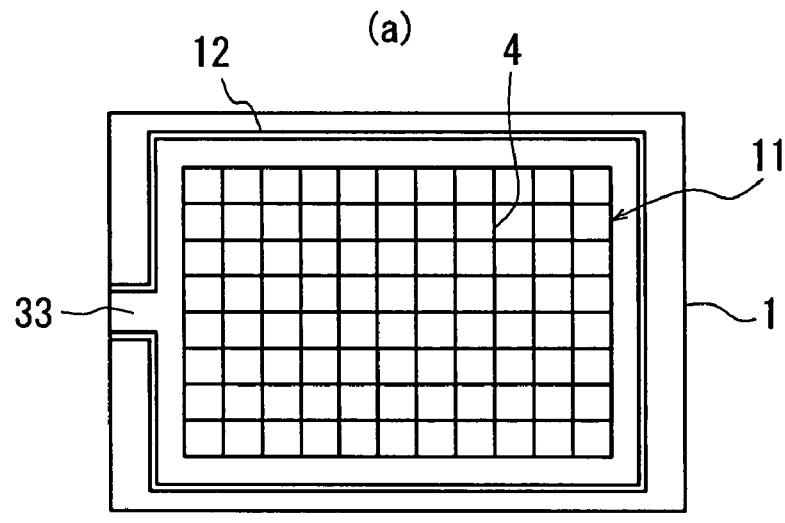
(a)
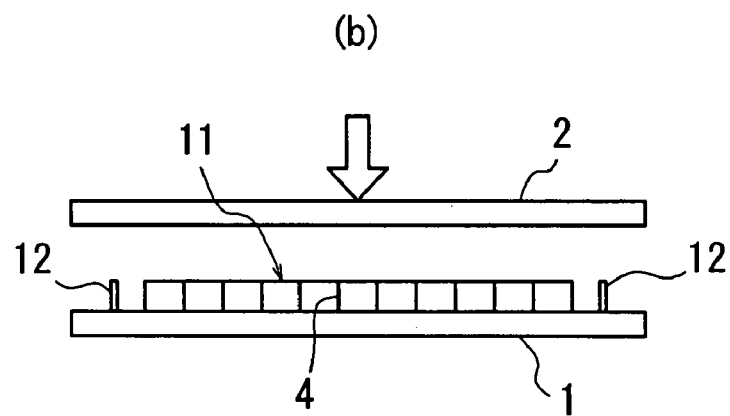
(b)
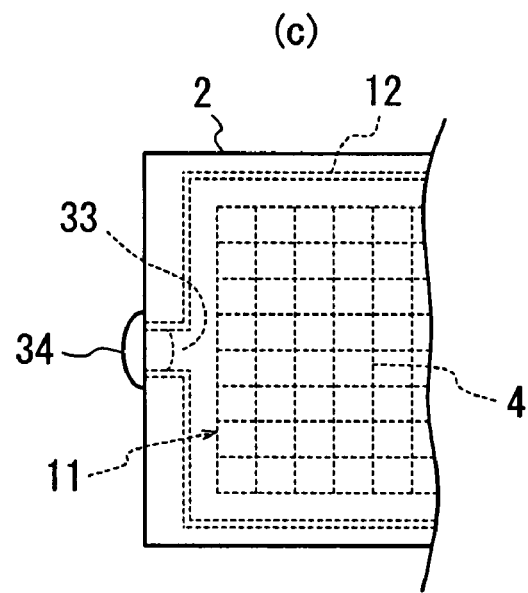
(c)

FIG. 12
(a)
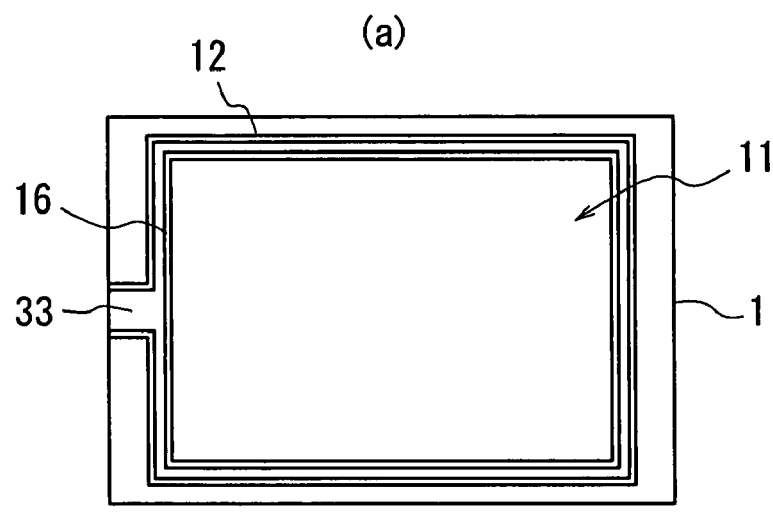
(b)
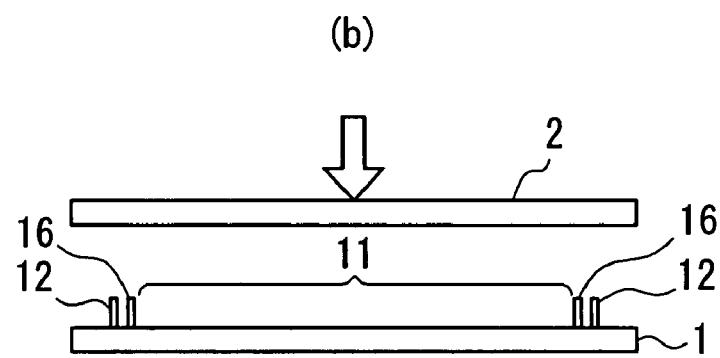
(c)
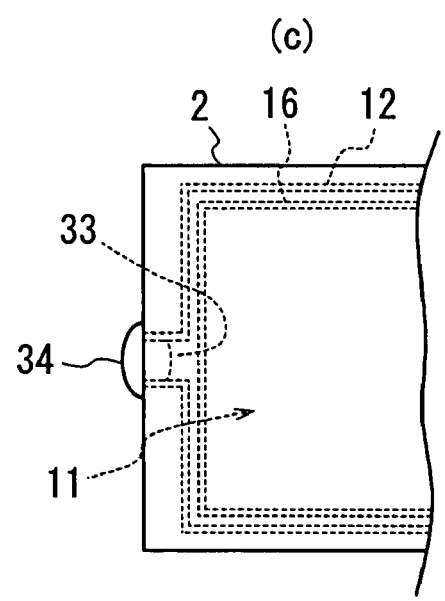

FIG. 13
(a)
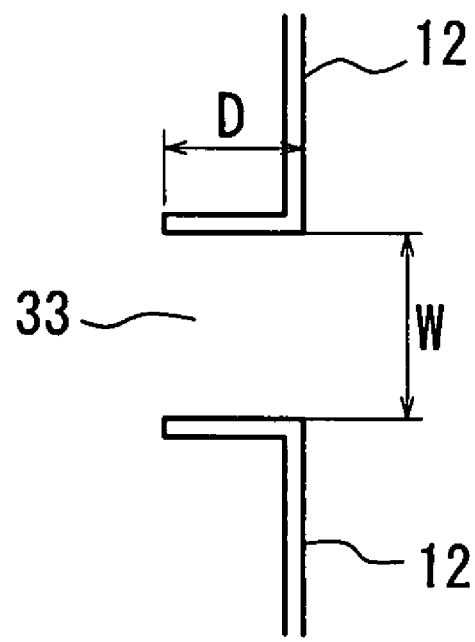
(b)
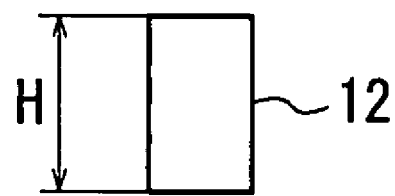

FIG. 20
PRIOR ART
(a)
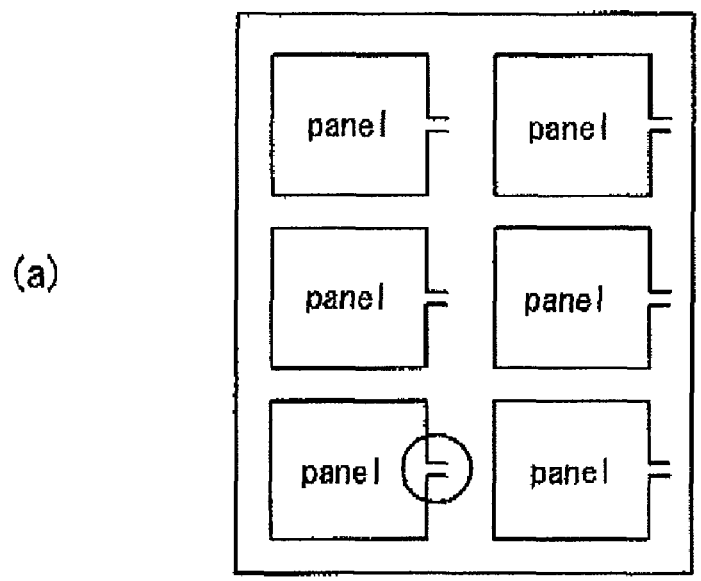
(b)
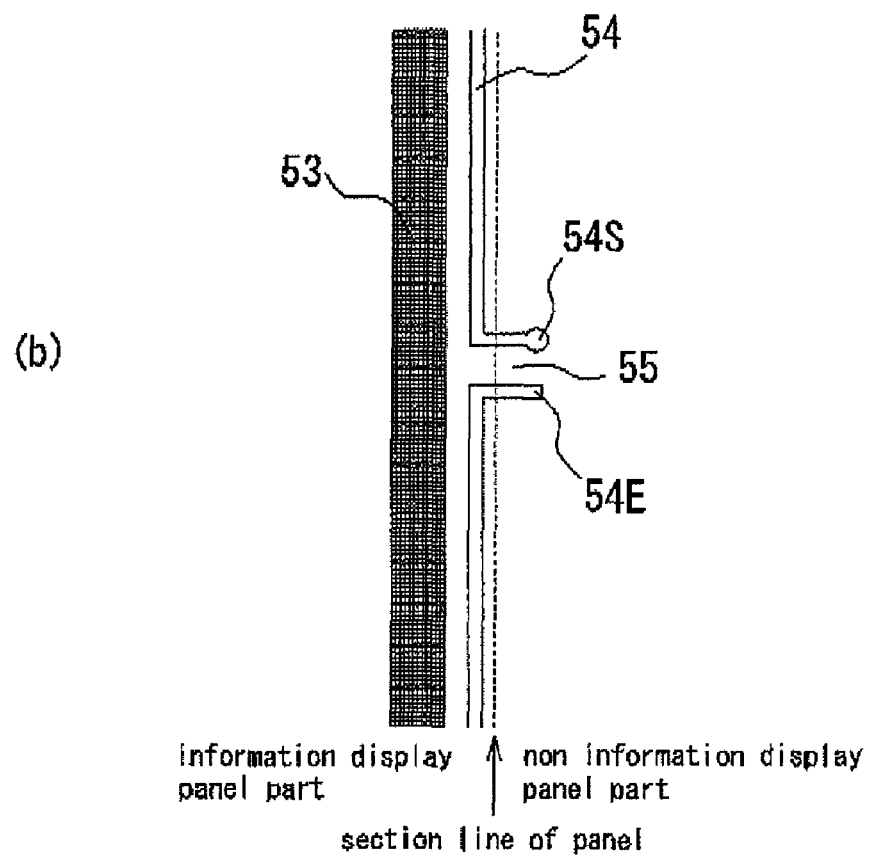
information display panel part | non information display panel part
section line of panel

INFORMATION DISPLAY PANEL

BACKGROUND OF THE INVENTION

1. Field of the Invention

The present invention relates to an information display panel, wherein display media consisting of at least one kind of particle and having optical reflectance and charging characteristics are sealed between two opposed substrates, at least one of which is transparent, and wherein the display media, to which an electrostatic field is applied, are made to move so as to display information such as an image or the like, and also relates to a mother panel to obtain the information display panel.

2. Description of Related Art

As an information display device substitutable for liquid crystal display (LCD), information display device with the use of technology such as an electrophoresis method, an electro-chromic method, a thermal method, dichroic-particles-rotary method have been proposed.

These conventional techniques are considered to be useful for inexpensive visual display devices of the next generation compared with a LCD due to merits such as wider field of vision close to normal printed matter, smaller power consumption or a memory function and expected to be spread out to information displays for portable devices, electronic paper and the like. Recently, electrophoresis method for microencapsulating dispersion liquid made up with dispersion particles and solution and disposing the liquid between opposed substrates, is proposed and expected.

However, in the electrophoresis method, there is a problem that a response rate is slow by the reason of viscosity resistance because the particles migrate among the electrophoresis solution. Further, there is a problem of lacking image writing repetition stability, because particle with high specific gravity and it is difficult to maintain a stability of dispersion state. Even in the case of microencapsulating, the cell size is diminished to a microcapsule level in order to make it hard to show the above-mentioned drawbacks, however, and essential problem is not overcome at all.

Besides the electrophoresis method using behavior in the solution, recently, a method that electro-conductive particles and a charge transport layer are installed in a part of the substrate without using solution has been proposed. [The Imaging Society of Japan "Japan Hardcopy '99' (Jul. 21-23, 1999) Transaction Pages 249-252"] However, the structure becomes complicated because the charge transport layer and further a charge generation layer are to be arranged. In addition, it is difficult to constantly charge the electro-conductive particles, and thus there is a drawback on the lack of display stability.

As one method for overcoming the various problems mentioned above, an information display panel is known, wherein display media consisting of at least one kind of particle and having optical reflectance and charging characteristics are sealed in a cell made by two opposed substrates, and wherein the display media, to which an electrostatic field is applied, are made to move so as to display information such as an image or the like.

In the above-mentioned information display panel, there is a sealing agent placement part in an outer edge portion of a substrate to seal a gap between two substrates by a sealing agent. The display side substrate is pressed by a ram head of a pressing machine and the two substrates are jointed with each other. A member for securing the gap space (rib) is formed on at least either the outer peripheral side or the inner peripheral side of the sealing agent placement part to prevent the display side substrate from bent when a ram head of a pressing machine presses the substrate used as the display side substrate such as one made from resin, which is easy to be bent, to joint two substrates. (Refer to, for example, WO2006/062155)

A method of forming a sealing agent 54 arranged in a sealing agent placement part is known, as shown in FIG. 19 as an example, that an opening portion 55 is provided at a part of the sealing agent 54 arranged in the sealing agent placement part in order to prevent puncture of the sealing agent when the substrate 51 and the opposed substrate are pressed to be attached and to allow gas to escape.

As a typical method used in the sealing agent placement process, a dispense method and a screen printing method are known. The dispense method is a method of applying and arranging a sealing agent discharging from a dispenser on a substrate and it is necessary to make the sealing agent unicursal for each pattern. The screen printing method is a method of copying and arranging the sealing agent on a necessary area with a mask. The dispense method is also used for applying the sealing agent to seal an opening provided in a part of the sealing agent arranged.

In FIG. 20 there is shown an example of other conventional example of an opening portion 55 provided in the sealing agent 54 arranged in the sealing agent placement part.

FIG. 20a is a mother substrate sheet for producing an information display panel. This mother substrate sheet is a substrate before attached, in which a sealing agent is arranged in a sealing agent placement part on at least one area corresponding to each information display panel.

Two mother substrate sheets attached with each other, which are not divided into each information display panel yet, are called a mother panel. FIG. 20b is an enlarged view of the opening portion of the information display panel surrounded with a circle shown in FIG. 20a. In FIG. 20b, a dashed line indicates a section line of the mother panel. The left side of the dashed line indicates an information display panel part having display area 53 while the right side indicates a non information display panel part. The mother panel is cut along the dashed line to obtain an information display panel.

A first problem of the above-mentioned conventional information display panel will be described. The amount of the sealing agent arranged in a seal corner part is more than that in other areas so that deformation such as corner break and the like generated in the substrate press process easily occurs at the seal corner part. When the amount of deformation is especially large and when the sealing part and the member for securing the gap are contacted, there are risks that a hole is generated in a part of the sealing part or sealing property is degraded because the line width of the sealing part locally becomes thin.

As a second problem, in the producing method disclosed in the above-mentioned [The Imaging Society of Japan "Japan Hardcopy '99' (Jul. 21-23, 1999) Transaction Pages 249-252"], the opening portion 55 provided in the sealing agent 54 arranged in the sealing agent placement part is used only for degasification when the substrate 51 is attached to the other substrate by pressing and there is no description about the handling after the information display panel is produced. It is considered that the opening portion 55 should be sealed in order to ensure the panel reliability, however, a producing method of sealing the opening portion 55 in an appropriate state has not been found.

As a third problem, in FIG. 20b the placement start portion 54S of the sealing agent after the sealing agent is arranged is likely to be larger than the design value when the dispense method is used. That is because a dispenser is likely to cause dripping just after starting discharge.

The opening portion 55 is provided at a part of the sealing agent of the sealing agent placement part and sealed after two substrates are attached. In order to ensure the sealing, the opening portion 55 with an excessively narrow width is provided. Therefore, due to dripping or seal crack in pressing the substrates, the opening portion 55 is easily sealed, which means that there is no escape of gas generated when the sealing agent is cured and results in problems such as seal puncture and the like.

When the screen printing method is used, at the end portions such as the placement start portion 54S and placement last portion 54E of the sealing agent after the sealing agent is arranged shown in FIG. 20b, the amount of copy of the sealing agent is larger so that the opening is likely to be sealed as is the case using the dispense method.

SUMMARY OF THE INVENTION

It is an object of the present invention is to eliminate the problems above mentioned and to provide an information display panel capable of ensuring a proper gap to which a proper electrostatic field is applied by voltage application and preferably preventing break of the information display panel by sealing the opening, which is necessary for allowing internal gas in attaching the substrates to escape, in the optimal state after the substrates are attached.

The information display panel of the present invention, wherein display media consisting of at least one kind of particle and having optical reflectance and charging characteristics are sealed between two opposed substrates, at least one of which is transparent, wherein the display media, to which an electrostatic field is applied, are made to move so as to display information such as an image or the like, and wherein, in the outer and inner peripheral sides of a sealing agent placement part provided in the outer edge portion of an information display area of the information display panel to seal a gap between one substrate and the other substrate, a member for securing a gap space is formed, comprising the construction such that the member for securing the gap space (bar spacer) provided in the outer peripheral side of the sealing agent placement part is provided evenly in each side and densely in each corner portion, and the member for securing the gap space (frame rib) provided in the inner peripheral side of the sealing agent placement part is provided with its chamfered corners in each corner portion.

In the information display panel of the present invention, the member for securing the gap space (frame rib) provided in the inner peripheral side of the sealing agent placement part preferably has a chamfered shape, a step like shape or an arched shape.

In the information display panel of the present invention, the sealing agent arranged in the sealing agent placement part provided in the outer edge portion of the information display area on one substrate preferably has at least one opening portion, which is used as a hole to allow gas to escape in attaching the other substrate and sealed by means of an ultraviolet cure adhesive (sealant).

In the information display panel of the present invention, the ultraviolet cure adhesive (sealant) is preferably composed of acrylate oligomer, 2-hydroxyethyl methacrylate, and photo polymerization initiator with a ratio of 2-hydroxyethyl methacrylate being within a range between 20 and 40% by weight.

In the information display panel of the present invention, it is preferable that viscosity of the ultraviolet cure adhesive (sealant) is within a range between 3.0 and 50 Pa·s measured by a B-type viscometer in 20 rotations and that shrinkage ratio in curing is not more than 10%.

In the information display panel of the present invention, under an atmosphere pressure or a reduced pressure less than the atmosphere pressure by 0.1 kPa-0.5 kPa, a given amount of the ultraviolet cure adhesive (sealant) is applied to the opening portion to penetrate and is cured by illuminating an ultraviolet ray from an ultraviolet ray irradiating device.

In the information display panel of the present invention, under an atmosphere pressure or a reduced pressure less than the atmosphere pressure by 0.1 kPa-0.5 kPa, a given amount of the ultraviolet cure adhesive (sealant) is applied to the opening portion by means of a dispenser to penetrate and is cured by illuminating an ultraviolet ray from an ultraviolet ray irradiating device.

In the information display panel of the present invention, under an atmosphere pressure or a reduced pressure less than the atmosphere pressure by 0.1 kPa-0.5 kPa, a jig, to which a given amount of the ultraviolet cure adhesive (sealant) applied in advance, is contacted to the opening portion so that the ultraviolet cure adhesive (sealant) is applied and penetrated into the opening portion and is cured by irradiating an ultraviolet ray from an ultraviolet ray irradiating device.

In the information display panel of the present invention, it is preferable that as the ultraviolet ray irradiating device, a LED emanating an ultraviolet ray is used and the ultraviolet cure adhesive is cured at a low temperature not more than 70 degree C.

In the information display panel of the present invention, it is preferable that when the opening portion is provided in a part of the sealing agent arranged in the sealing agent arranged in the sealing agent placement part, at least a sealing agent placement start part, which is one end of the sealing agent arranged in the sealing agent placement part, extends to a location away from the opening provided in a part of the sealing agent arranged in the sealing agent placement part, and the member for securing the gap space is provided in the neighborhood of the opening portion.

In the information display panel of the present invention, it is preferable that both a sealing agent placement start part and a sealing agent placement end part, which are ends of the sealing agent arranged in the sealing agent placement part, extend to a location away from the opening provided in a part of the sealing agent arranged in the sealing agent placement part, and the member for securing the gap space is provided in the neighborhood of the opening portion.

In the information display panel of the present invention, when the member for securing the gap space is arranged in the opening portion and seal corner parts, the member for securing the gap space having a small area pattern is preferably arranged.

In the information display panel of the present invention, when the member for securing the gap space is arranged in a part surrounded by the sealing agent arranged in the sealing agent placement part, the member for securing the gap space having a small area pattern is preferably arranged in low density.

A mother panel of the information display panel of the present invention is formed in such a manner that two mother sheet substrates used for producing at least one of the above-mentioned information display panel are attached with a predetermined gap.

According to the present invention, it is possible to provide an information display panel capable of ensuring a proper gap to which a proper electrostatic field is applied by voltage application to attach two mother substrate sheets and having excellent sealing performance without break or deformation of the sealing agent by optimizing the shape of the member for securing the gap space provided in the outer and inner peripheral sides of the sealing agent placement part provided in the outer edge portion of the information display area of the panel to seal a gap between one substrate and the other substrate.

BRIEF DESCRIPTION OF THE DRAWINGS

FIGS. 3a and 3b are schematic views respectively showing still another example of the information display panel according to the present invention.

FIGS. 8a and 8b are schematic views respectively showing one example of a conventional information display panel.

FIG. 10a is a schematic view showing examples of the frame rib cut and FIG. 10b is a schematic view showing arranging examples of the bar spacers.

FIGS. 11a to 11c are schematic views respectively showing one example of a method of producing the information display panel according to the present invention.

FIGS. 12a to 12c are schematic views respectively showing another example of a method of producing the information display panel according to the present invention.

FIGS. 13a and 13b are schematic views respectively showing one example of the opening portion provided in the sealing agent arranged in the sealing agent placement part.

FIGS. 20a and 20b are schematic views respectively showing one example of a configuration of a mother panel of a conventional information display panel.

DESCRIPTION OF THE PREFERRED EMBODIMENTS

Figure 1:
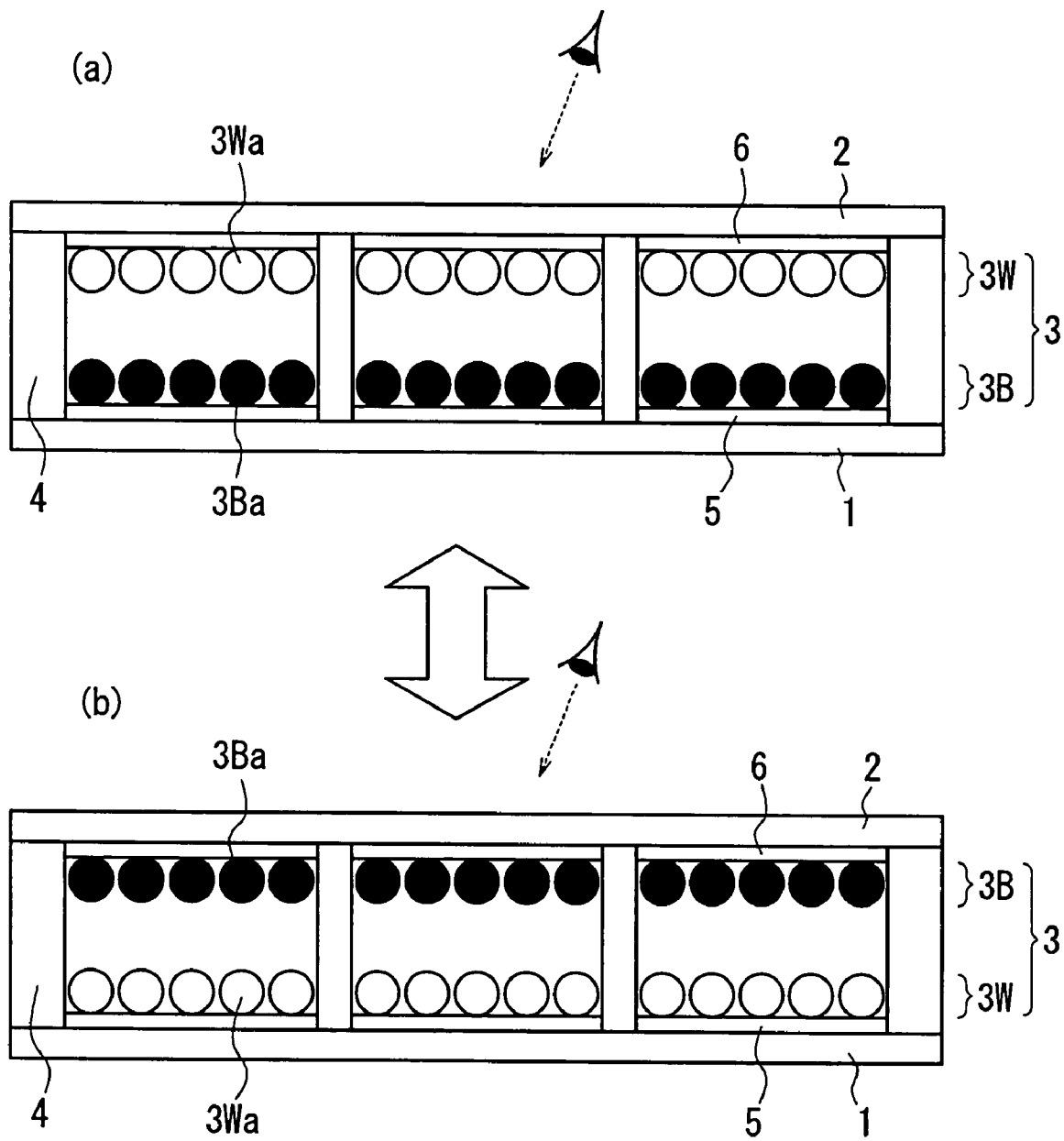
FIGS. 1a and 1b are schematic views respectively showing one example of the information display panel according to the present invention.
Figure 2:
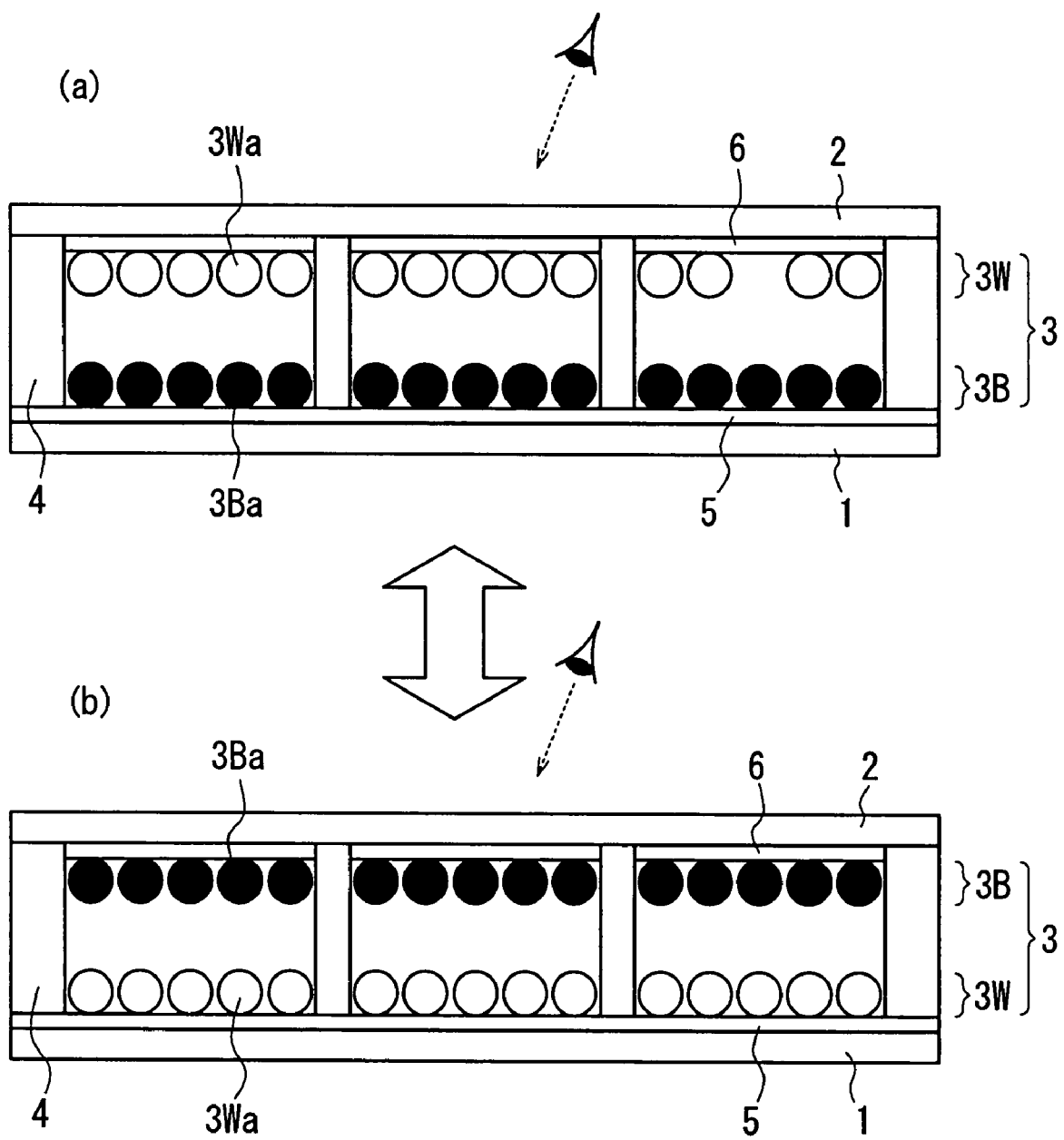
FIGS. 2a and 2b are schematic views respectively showing another example of the information display panel according to the present invention.
Figure 4:
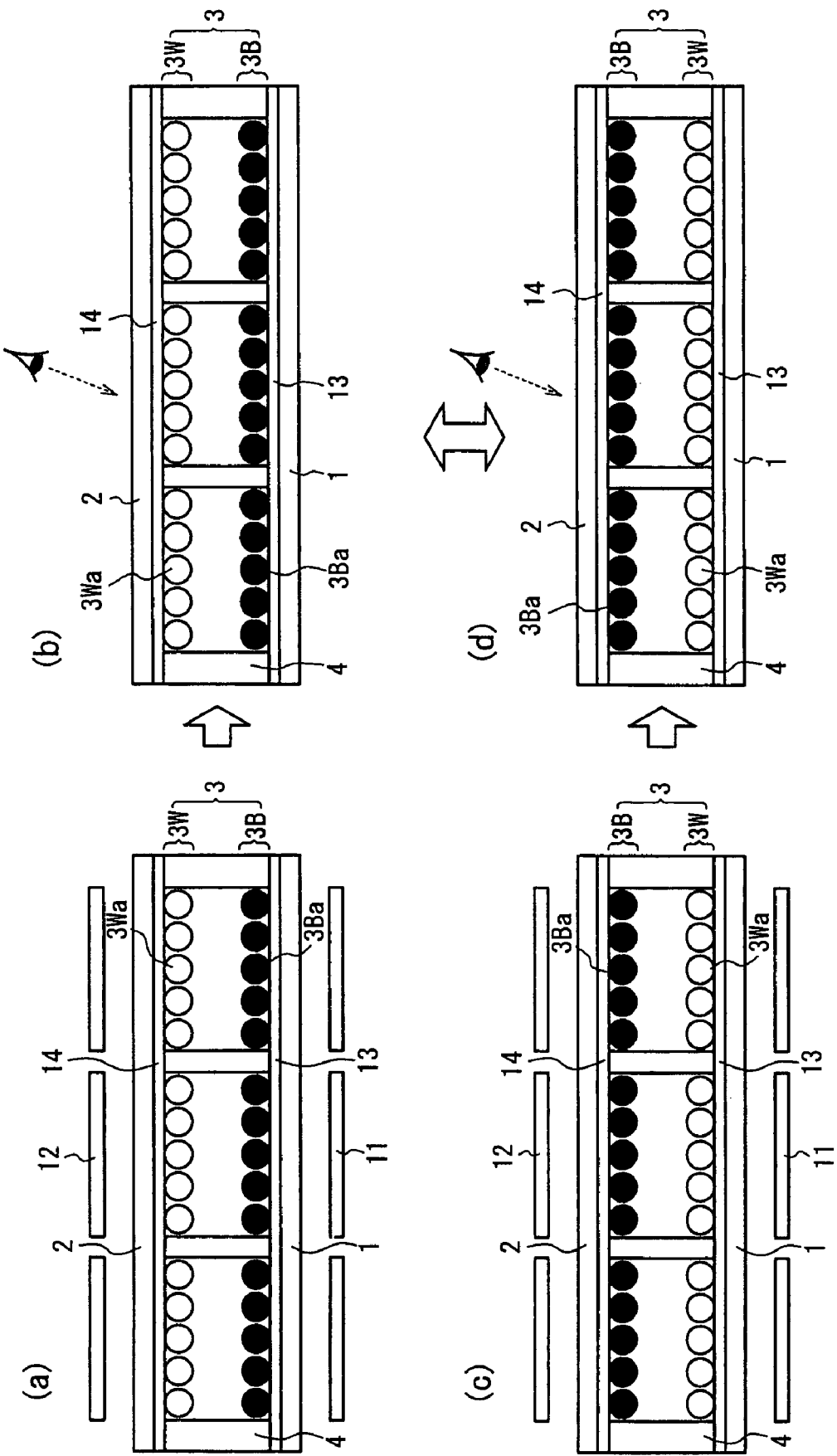
FIGS. 4a to 4d are schematic views respectively showing still another example of the information display panel according to the present invention.
Figure 5:
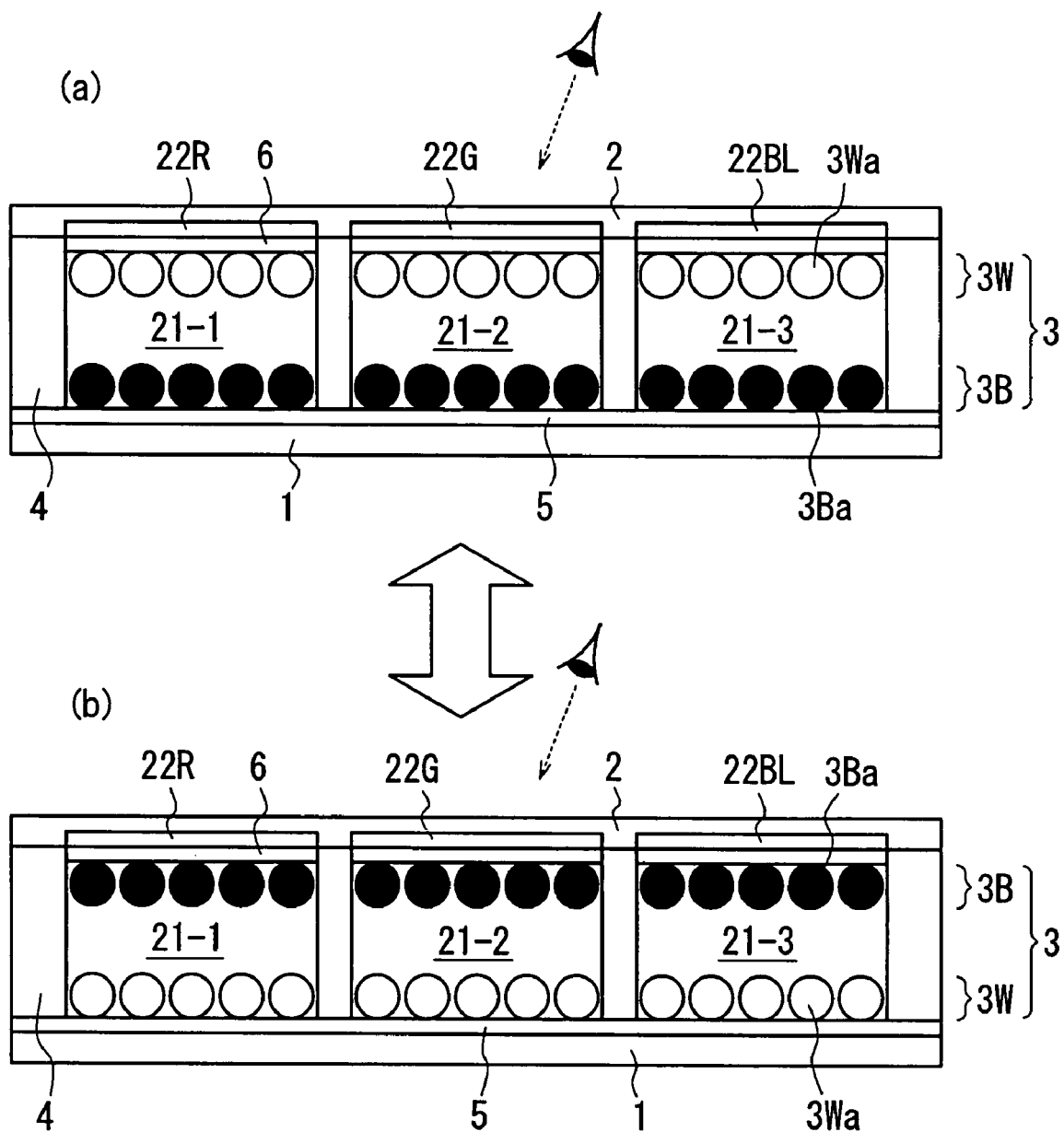
FIGS. 5a and 5b are schematic views respectively showing still another example of the information display panel according to the present invention.

At first, a basic construction of an information display panel according to the present invention will be described. In the information display panel used in the present invention, an electrostatic field is applied to display media consisting of display particles having optical reflectance and charging characteristics sealed in the space between two opposed substrates. Along a direction of the applied electrostatic field by means of the force of the electrostatic field, Coulomb's force or the like, the charged display media are attracted and moved by varying a direction of electrostatic field. Accordingly, information such as an image or the like can be displayed. Therefore, it is necessary to design the information display panel in such a manner that the display media can move evenly and maintain stability during a reciprocal operation or during a reserving state. Here, as to forces applied to the particles constituting display media, there are an attraction force between the particles due to Coulomb' force, an imaging force with respect to the electrodes or substrates, an intermolecular force, a liquid bonding force, a gravity and the like.

An example of the information display panel of the present invention will be explained with reference to FIGS. 1a and 1b-FIG. 7.

In the examples shown in FIGS. 1a and 1b, at least two or more groups of display media 3 having different optical reflectance and charging characteristics and consisting of at least one or more groups of particles (here, a white particle 3W consisting of particles for white display media 3Wa and a black particle 3B consisting of particles for black display media 3Ba are shown) are moved in each cell formed by partition walls 4 perpendicularly with respect to substrates 1 and 2, in accordance with an electric field applied between an electrode (discrete electrode) 5 arranged on the substrate 1 and an electrode (discrete electrode) 6 arranged on the substrate 2. A white color is displayed by viewing the white particle 3W to an observer as shown in FIG. 1a or a black color is displayed by viewing the black particle 3B to the observer as shown in FIG. 1b. In FIGS. 1a and 1b, the partition wall arranged at a near side is omitted.

In the examples shown in FIGS. 2a and 2b, at least two or more groups of display media 3 having different optical reflectance and charging characteristics and consisting of at least one or more groups of particles (here, a white particle 3W consisting of particles for white display media 3Wa and a black particle 3B consisting of particles for black display media 3Ba are shown) are moved in each cell formed by partition walls 4 perpendicularly with respect to substrates 1 and 2, in accordance with an electric field applied between an electrode (line electrode) 5 arranged on the substrate 1 and an electrode (line electrode) 6 arranged on the substrate 2. A white color is displayed by viewing the white particle 3W to an observer as shown in FIG. 2a or a black color is displayed by viewing the black particle 3B to the observer as shown in FIG. 2b. In FIGS. 2a and 2b, the partition wall arranged at a near side is omitted.

In the examples shown in FIGS. 3a and 3b, display media 3 having optical reflectance and charging characteristics and consisting of at least one or more groups of particles (here, a white particle 3W consisting of particles for white display media 3Wa are shown) are moved in each cell formed by partition walls 4 parallel with respect to substrates 1 and 2, in accordance with an electric field applied between an electrodes 5 and 6 arranged on the substrate 1. A white color is displayed by viewing the white particle 3W to an observer as shown in FIG. 3a or a black color is displayed by viewing a black plate 7 to the observer as shown in FIG. 3b. In FIGS. 3a and 3b, the partition wall arranged at a near side is omitted.

In the examples shown in FIGS. 4a to 4d, as shown in FIGS. 4a and 4c at least two or more groups of display media 3 having different optical reflectance and charging characteristics and consisting of at least one or more groups of particles (here, a white particle 3W consisting of particles for white display media 3Wa and a black particle 3B consisting of particles for black display media 3Ba are shown) are moved in each cell formed by partition walls 4 perpendicularly with respect to substrates 1 and 2, in accordance with an electric field applied between an external electrical field forming means 31 arranged outside the substrate 1 and an external electrical field forming means 32 arranged outside the substrate 2. A white color is displayed by viewing the white particle 3W to an observer as shown in FIG. 4b or a black color is displayed by viewing the black particle 3B to the observer as shown in FIG. 4d. In FIGS. 4a to 4d, the partition wall arranged at a near side is omitted. In addition, a conductive member 33 is arranged inside the substrate 1 and a conductive member 34 is arranged inside the substrate 2. These conductive members may not be arranged.

The conductive member may be arranged inside the substrate, outside the substrate or embedded in the substrate.

In the examples shown in FIGS. 5a and 5b, a color display utilizing a display unit (one dot) constituted by three cells is explained. In the examples shown in FIGS. 5a and 5b: the white color display media 3W and the black color display media 3B are filled in all cells 21-1 to 21-3 as the display media; a red color filter 22R is arranged to the first cell 21-1 at the observer's side; a green filter 22G is arranged to the second cell 21-2 at the observer's side; and a blue color filter 22BL is arranged to the third cell 21-3 at the observer's side, so that the display unit (one dot) is constructed by three cells of the first cell 21-1, the second cell 21-2 and the third cell 21-3. In this embodiment, as shown in FIG. 5a, a white color display is performed for the observer by moving the white color display media 3W in all the first cell 21-1 to the third cell 21-3 to the observer's side, or, as shown in FIG. 5b, a black color display is performed for the observer by moving the black color display media 3B in all the first cell 21-1 to the third cell 21-3 to the observer's side. Moreover, in FIGS. 5a and 5b, the partition walls arranged at the near side are omitted. According to how to move the display media in each cell, a multi color display can be performed.

The above explanations can be applied to a case such that the white particles 3W consisting of particles are substituted by white display media consisting of white liquid powders or a case such that the black particles 3B consisting of particles are substituted by black display media consisting of black liquid powders. The particles will be explained below.

Figure 6:
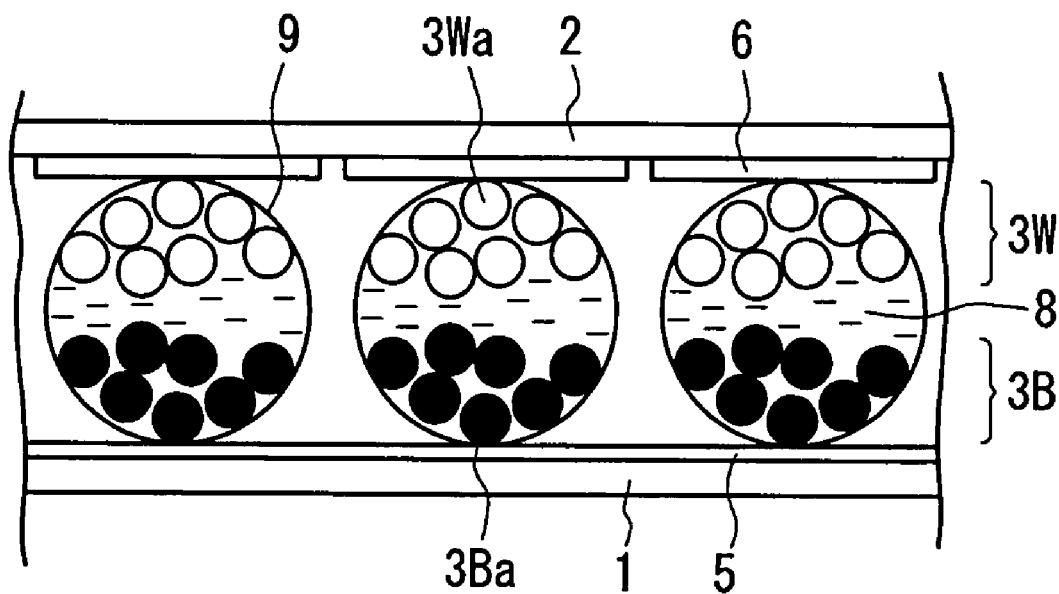
FIG. 6 is a schematic view showing still another example of the information display panel according to the present invention.
Figure 7:
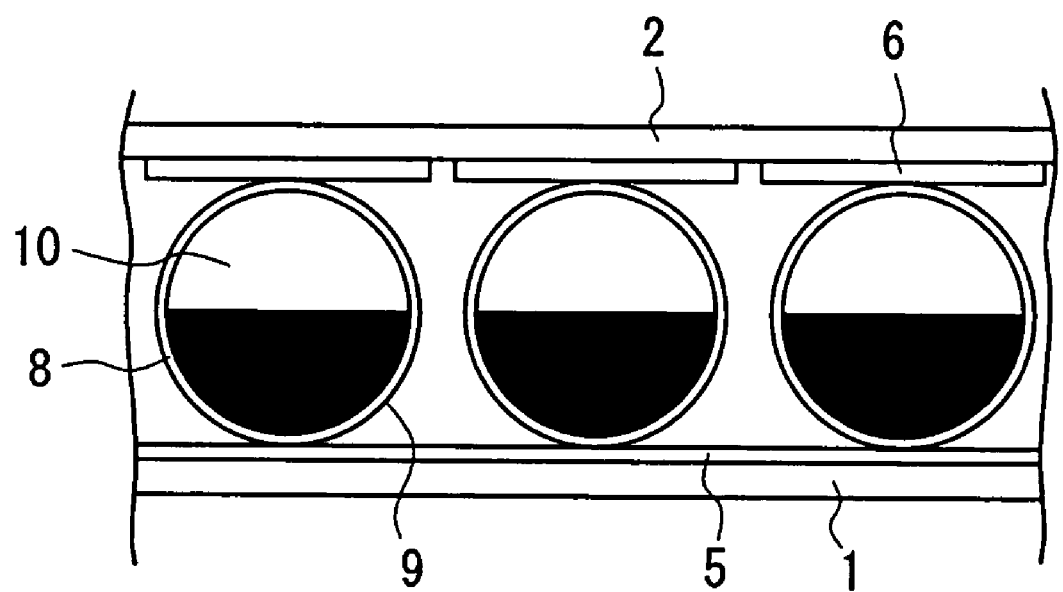
FIG. 7 is a schematic view showing still another example of the information display panel according to the present invention.

In the examples shown in FIG. 6 and FIG. 7, another embodiment, wherein the white/black color display is performed by utilizing the line electrodes 5 and 6 as is the same as the embodiment shown in FIGS. 2a and 2b, is explained. In the example shown in FIG. 6, use is made of a micro capsule 9, in which the white color display media 3W and the black color display media 3B are filled together with an insulation liquid 8, instead of the cell formed by the partition walls 4, in which the white color display media 3W and the black color display media 3B are filled as shown in FIGS. 2a and 2b.

Moreover, in the example shown in FIG. 7, use is made of a micro capsule 9, in which a particle of a rotating ball 10 type whose surface is divided into halves, one half being a white color and the other half being a black color, and their polarity being different, is filled together with an insulation liquid 8, instead of the cell formed by the partition walls 4, in which the white color display media 3W and the black color display media 3B are filled as shown in FIGS. 2a and 2b. In both examples shown in FIG. 6 and FIG. 7, the white/black color display can be performed, as is the same as the embodiment shown in FIG. 2b.

FIGS. 8a and 8b are schematic views respectively showing one example of a conventional information display panel, FIG. 8a being its plan view and FIG. 8b being its front view. In the examples shown in FIGS. 8a and 8b, there is provided a sealing agent placement part 12, for example, on the back side substrate 1, in the outer area of the information display area 11 of the panel consisting of a plurality of cells formed by partition walls 4 (not shown) in order to seal the gap between the substrates 1 and 2. In the examples shown in FIGS. 8a and 8b, a plurality of members for securing the gap space (bar spacers) 13 having a linear shape are provided in the outer peripheral side of the sealing agent placement part 12 while a member for securing the gap space (frame rib) 16 is provided in the inner peripheral side of the sealing agent placement part 12. Between the members for securing the gap space 13, an air space 14 is provided. The height of the members for securing the gap space 13 is almost the same as that of the partition walls 4 provided in the information display area 11. In addition, the members for securing the gap space 13 are not provided in a location where the sealing agent placement part 12 is arranged.

In the examples shown in FIGS. 8a and 8b, the locations where the members for securing the gap space 13 are provide, are not limited to the outer peripheral side but may be the inner peripheral side, or both of the outer and inner peripheral sides. In addition, materials of the members for securing the gap space 13 is not especially limited but the similar material as that of the partition walls 4 may be preferably used. In addition, methods of forming the members for securing the gap space 13 is not especially limited but the similar method as that of forming the partition walls 4 may be used and the members for securing the gap space 13 may be formed simultaneously when the partition walls 4 are formed.

In the example mentioned above, the members for securing the gap space 13 may be continuous or discontinuous, and the shape may be wall like, linear, spherical or broken line. In addition, the members for securing the gap space 13 may be formed by means of a photolithographic method with the same material as that of the partition walls 4 and at the same time as when the partition walls 4 are formed, or may not. The members for securing the gap space 13 may be formed by means of a photolithographic method after the partition walls 4 are formed. The members for securing the gap space 13 may be formed by other methods (for example, arranging columnar or spinning top like members).

Figure 9:
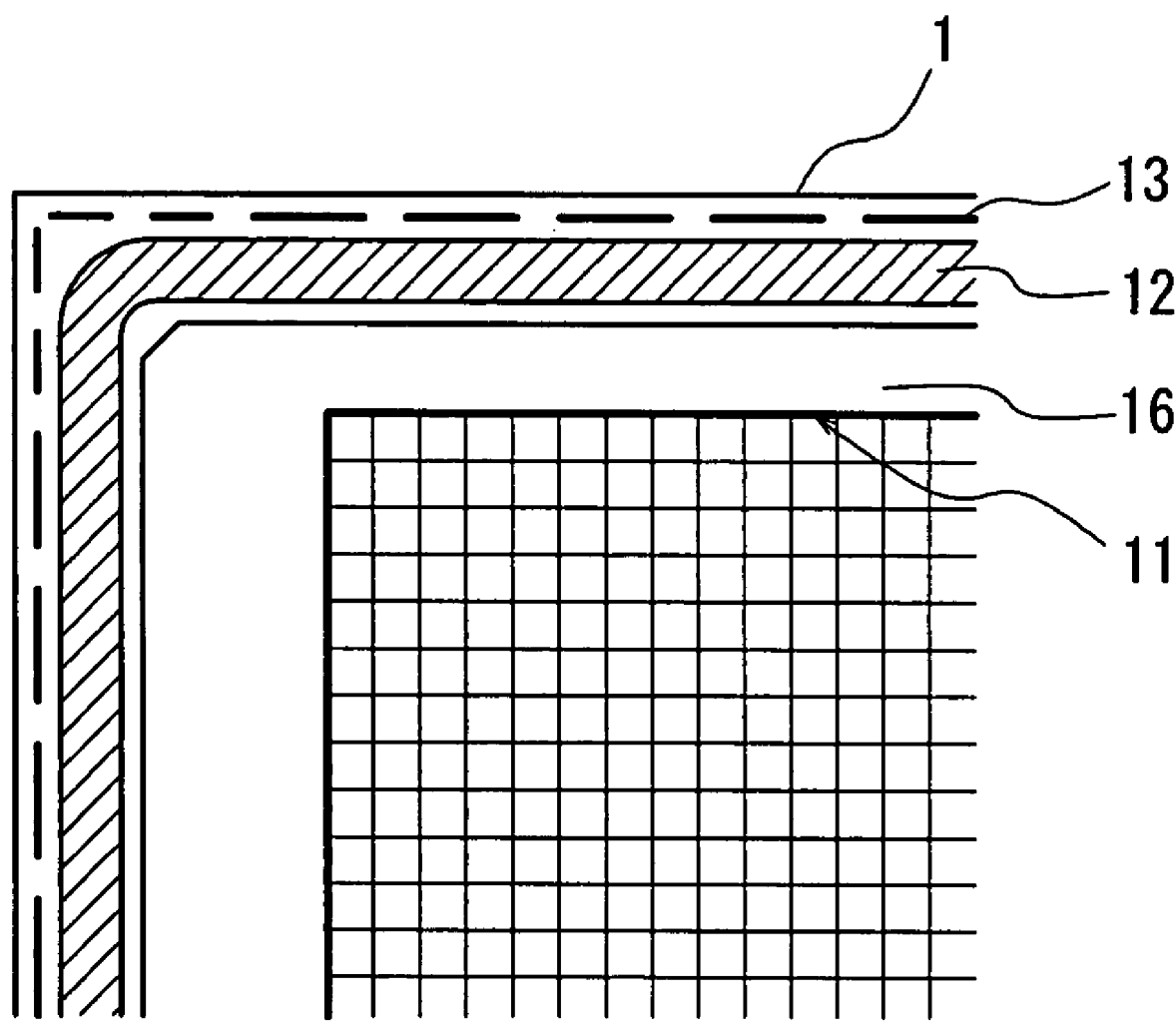
FIG. 9 is a schematic view showing one example of the arranging shape in the corner portion of the information display panel according to the present invention.

FIG. 9 is a schematic view showing an example of the arranging shape in the corner portion of the information display panel according to the present invention. The bar spacers 13 provided in the outer peripheral side of the sealing agent placement part 12 is provided evenly in each side and densely in each corner portion. The corner portion of the frame rib 16 provided in the inner peripheral side of the sealing agent placement part 12 is cut to round its corner off so that the frame rib 16 will not contact to the sealing agent placement part 12.

FIG. 10a is a schematic view showing examples of the frame rib cut and FIG. 10b is a schematic view showing arranging examples of the bar spacers. The corner portion of the frame rib (the members for securing the gap space of the inner side) may be a step like shape, an arched shape or the like other than the typical example shown in FIG. 9. On the other hand, the bar spacers (the members for securing the gap space of the outer side) are provided evenly in each side and densely in each corner portion, such as a dot type, a small bar type, a combination of dot and small bars or the like.

FIGS. 11a to 11c are schematic views respectively showing an example of a method of producing the information display panel according to the present invention. Hereinafter, the method of producing the information display panel according to the present invention will be illustrated with reference to FIGS. 11a to 11c. Firstly, as shown in FIG. 11a, a plurality of cells are formed by the partition walls 4 to form the information display area 11 of the panel and in the outer edge portion of the information display area 11, the sealing agent placement part 12 is provided in order to seal the gap between the substrate 1 and substrate 2 which is to be attached to the substrate 1. In a part of the sealing agent placement part 12, there is provided an opening portion 33 to allow gas to escape. It is noted that the number of the opening portion 33 is not limited to one but two or more opening portions may be provided although in this example, the sealing agent placement part 12 has one opening portion 33. Secondly, as shown in FIG. 11b, to the substrate 1, on which there are provided the information display area 11 formed by partition walls 4 and the sealing agent placement part 12, the display side substrate 2 is attached by pressing. In this case, the opening portion 33 is used as a hole to allow gas to escape. Thirdly, as shown in FIG. 11c, the opening portion 33 is sealed by means of ultraviolet cure adhesive 34 to obtain the information display panel of the present invention.

FIGS. 12a to 12c are schematic views respectively showing another example of a method of producing the information display panel according to the present invention. In the example shown in FIGS. 12a to 12c, the same member as illustrated in FIGS. 11a to 11c is denoted by the same numeral, and the explanation will be omitted. In the example shown in FIGS. 12a to 12c, the difference from the example shown in FIGS. 11a to 11c is that no partition walls are provided in the information display area 11 of the panel and that the member for securing the gap space 16 is provided between the information display area 11 and the sealing agent placement part 12. Other process and resulting advantages are the same as those of the example shown in FIGS. 11a to 11c.

FIGS. 13a and 13b are schematic views respectively showing an example of the opening portion provided in the sealing agent placement part. In the example shown in FIGS. 13a and 13b, it is preferable that in the information display panel having a size of 73 cm×104 cm, the height H (i.e., a gap between the substrates) of the opening portion 33 is within a range between 0.02 and 0.05 mm, the width W of the opening portion 33 is within a range between 0.50 and 5.00 mm and the depth D of the opening portion 33 is within a range between 0.50 and 2.00 mm.

As the adhesive 34 to seal the opening portion 33, any of ultraviolet cure adhesive may be used but it is preferable that the adhesive will be cured by irradiating an ultraviolet ray and the ultraviolet cure adhesive is composed of acrylate oligomer, 2-hydroxyethyl methacrylate, and photo polymerization initiator with a ratio of 2-hydroxyethyl methacrylate being within a range between 20 and 40% by weight. In addition, it is preferable that viscosity of the adhesive 34 is within a range between 3.0 and 50 Pa·s measured by a B-type viscometer in 20 rotations and that shrinkage ratio in curing is not more than 10%.

The method of arranging the ultraviolet cure adhesive 34 on the opening portion 33 is not especially limited and any methods may be used as long as the adhesive can be arranged on the opening portion 33, however, a following method is preferably used. That is to say, a method, in which under an atmosphere pressure or a reduced pressure less than the atmosphere pressure by 0.1 kPa-0.5 kPa, a given amount of the ultraviolet cure adhesive 34 is applied to the opening portion 33 by means of a dispenser to penetrate and is cured by irradiating an ultraviolet ray from an ultraviolet ray irradiating device, or a method, in which under an atmosphere pressure or a reduced pressure less than the atmosphere pressure by 0.1 kPa-0.5 kPa, a jig, to which a given amount of the ultraviolet cure adhesive 34 is applied in advance, is contacted to the opening portion 33 so that the ultraviolet cure adhesive 34 penetrates and is cured by irradiating an ultraviolet ray from an ultraviolet ray irradiating device is preferably used. In addition, it is preferable that as the ultraviolet ray irradiating device, a LED irradiating an ultraviolet ray is used and the ultraviolet cure adhesive is cured at a low temperature not more than 70 degree C.

Figure 14:
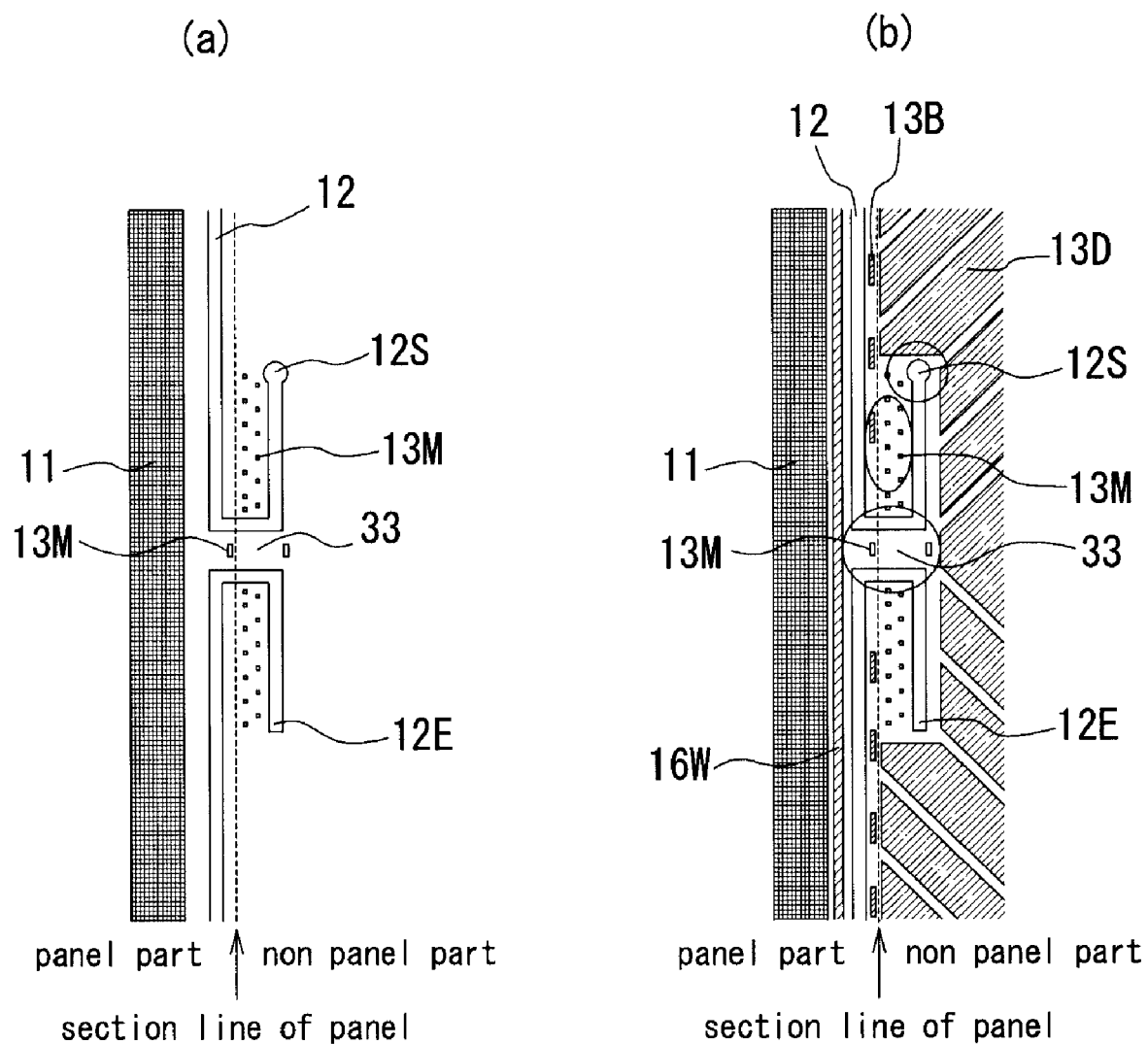
FIGS. 14a and 14b are enlarged views respectively showing one example of the opening portion of the sealing agent of the information display panel according to the present invention made by cutting a mother panel.

FIGS. 14a and 14b are enlarged views respectively showing an example of the opening portion of the information display panel according to the present invention made by cutting a mother panel. A start part 12S of the sealing agent placement part is arranged away from the opening portion 33 and an end part 12E of the sealing agent placement part is similarly arranged away from the opening portion 33. As a result, the edge parts, in which dripping is frequently generated, are arranged away from the opening portion 33 so that sealing defectives will be reduced.

Figure 15:
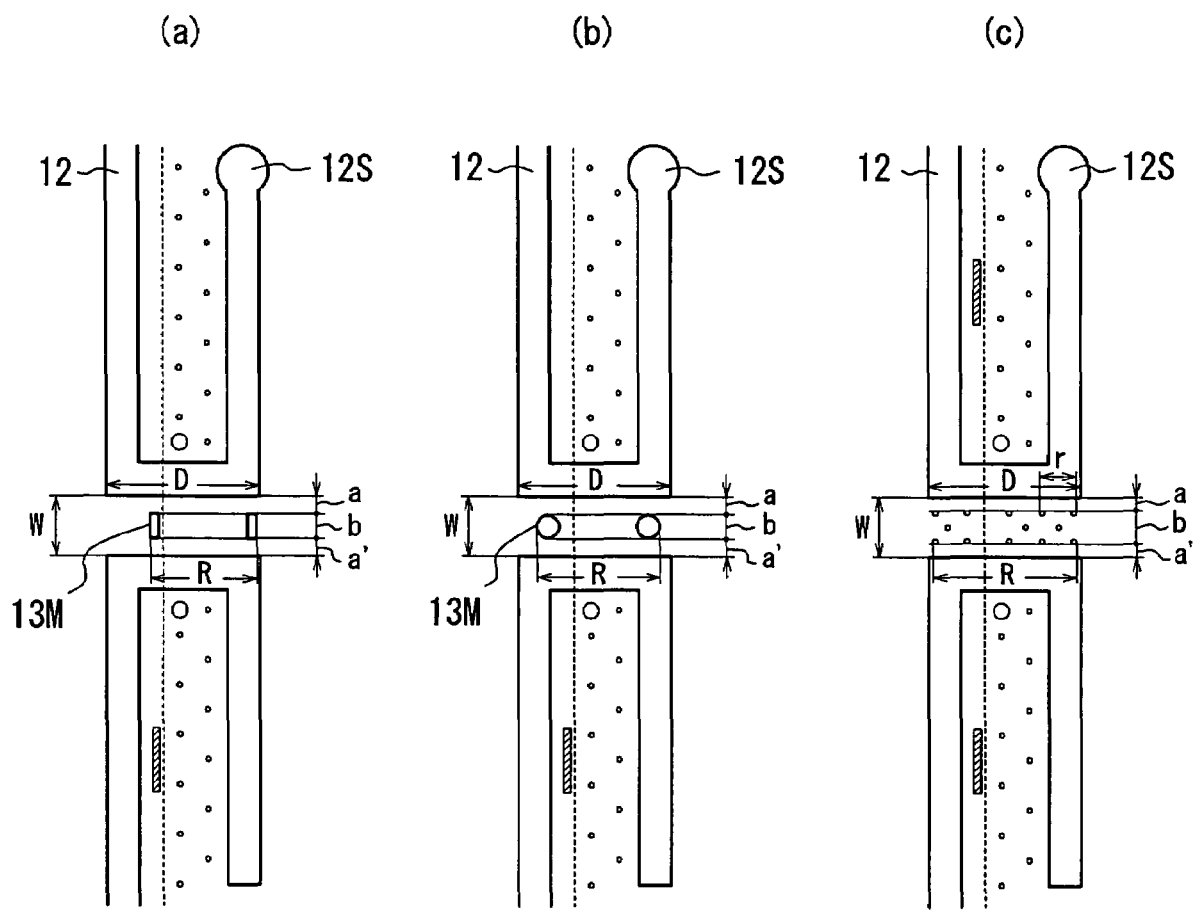
FIGS. 15a to 15c are enlarged views respectively showing one example of the shape of the member for securing the gap space having a small pattern.

In the opening portion 33 surrounded by the sealing agent placement part 12, the member for securing the gap space 13M having a small area pattern is arranged to secure the gap stably and to reduce the generation of seal crack in pressing the mother substrate sheet. The member for securing the gap space 13M having a small area pattern will be described with reference to FIGS. 15a to 15c. The shape of the member for securing the gap space 13M having a small area pattern may be a round shape, a rectangle shape or other shapes as shown in FIGS. 15a to 15c. In FIG. 15a, the member 13M has a rectangle shape, wherein the length of one side is indicated as b. In FIG. 15b, the member 13M has a round shape having its diameter b. In FIG. 15c, a number of the members 13M are arranged and the distance of the arranged area is indicated as b. The distances a, a' from the sealing agent placement part 12 to the member 13M is preferably within a range between 0.1 and 1 mm and more preferably within a range between 0.2 and 0.3 mm. This is because even when the sealing agent is arranged in slightly different location from the predetermined location, the sealing agent will be prevented from contacting the member 13M. The number of the member 13M is not less than 2. The distance r between each member 13M is within a range between 0.1 and 2 mm. The distance R between one member 13M and the other member 13M arranged farthest from the one member 13M and the depth D of the sealing agent placement part 12 in the opening portion 33 have the following relation: $0.3 < R/D < 1.2$. This is because unless the member 13M is arranged having a proper interval in a proper position, the member 13M cannot function as a member for securing the gap space. In addition, the total area where the members 13M are arranged is preferably within a range between $(D*W*0.01)mm^2$ and $(D*W*0.5)mm^2$, wherein W indicates the distance between the sealing agent placement parts 12 in the opening portion 33 in order to sufficiently secure the path of the gas generated when the sealing agent is cured.

Figure 16:
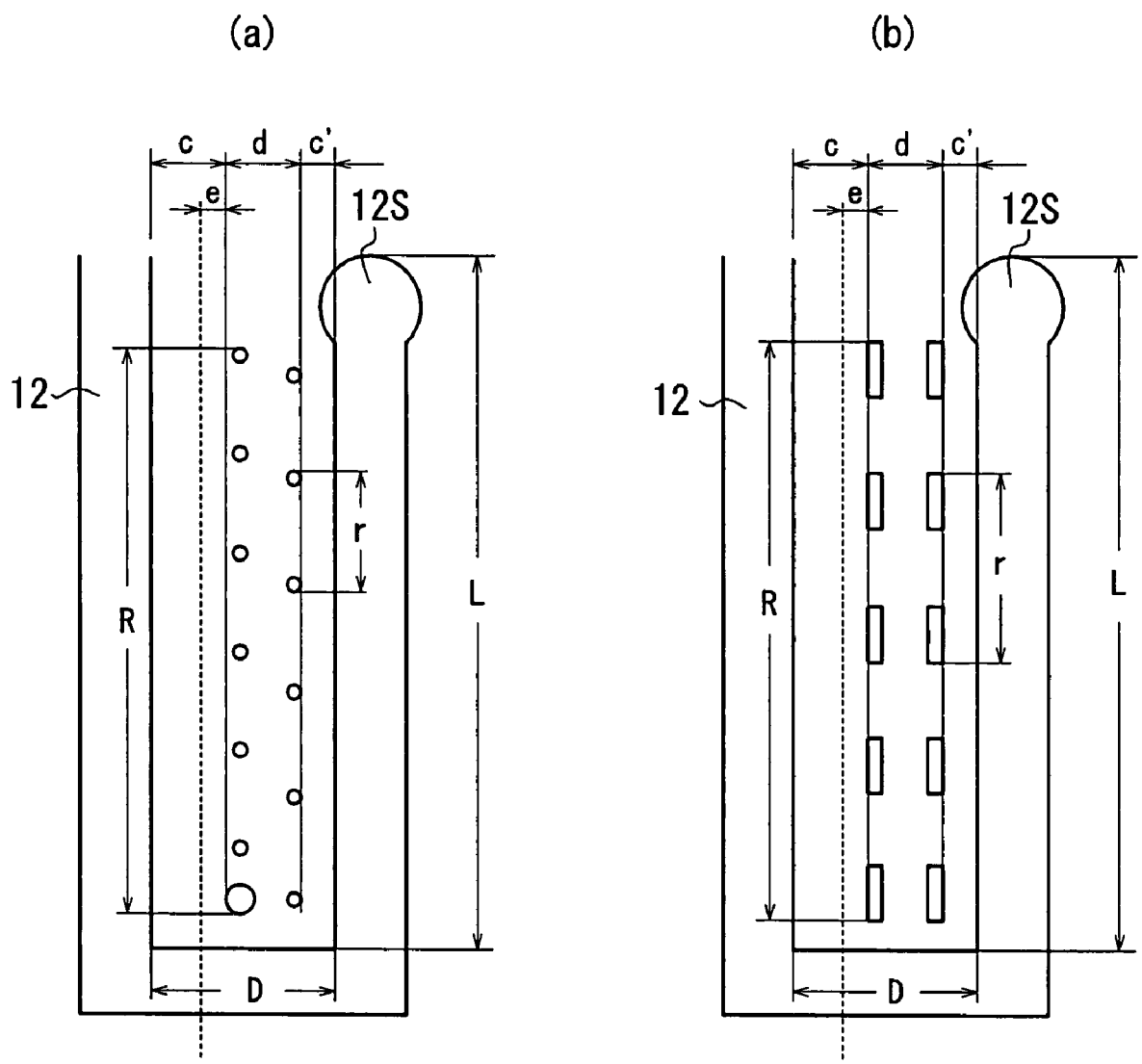
FIGS. 16a and 16b are enlarged views respectively showing another example of the shape of the member for securing the gap space having a small pattern.

Next, the member 13M arranged in he area surrounded by the sealing agent placement part 12 which is parallel to the edge of the information display panel will be described with reference to FIGS. 16a and 16b. The shape of the member 13M may be a round shape, a rectangle shape or other shapes as shown in FIGS. 16a and 16b. The distances c,c' from the sealing agent placement part 12 to the member 13M and the distance e from the section line of the panel to the member 13M is preferably within a range between 0.1 and 1 mm and more preferably within a range between 0.2 and 0.3 mm. As for the distances c, c', the reason is the same as that in the case of the opening portion 33, while as for the distance e, above range is due to the cutting property of the panel. The number of the member 13M is not less than 2. The distance r between each member 13M is within a range between 0.1 and 2 mm. The distance R between one member 13M and the other member 13M arranged farthest from the one member 13M and the distance L from the start part 12S to the corner of the sealing agent placement part 12 in the opening portion 33 have the following relation: $0.3<R/L<1.2$. This is because unless the member 13M is arranged having a proper interval in a proper position, the member 13M cannot function as a member for securing the gap space. In addition, the total area where the members 13M are arranged is preferably within a range between $(D*L*0.01)mm^2$ and $(D*L*0.5)mm^2$, in order to sufficiently secure the path of the gas generated when the sealing agent is cured.

In FIG. 14b, as the members for securing the gap space, frame ribs 16W are arranged in the information display panel part which is the inner peripheral side of the sealing agent placement part 12, bar spacers 13B and dummy ribs 13D are arranged in the non information display panel part which is the outer peripheral side of the sealing agent placement part 12.

Figure 17:
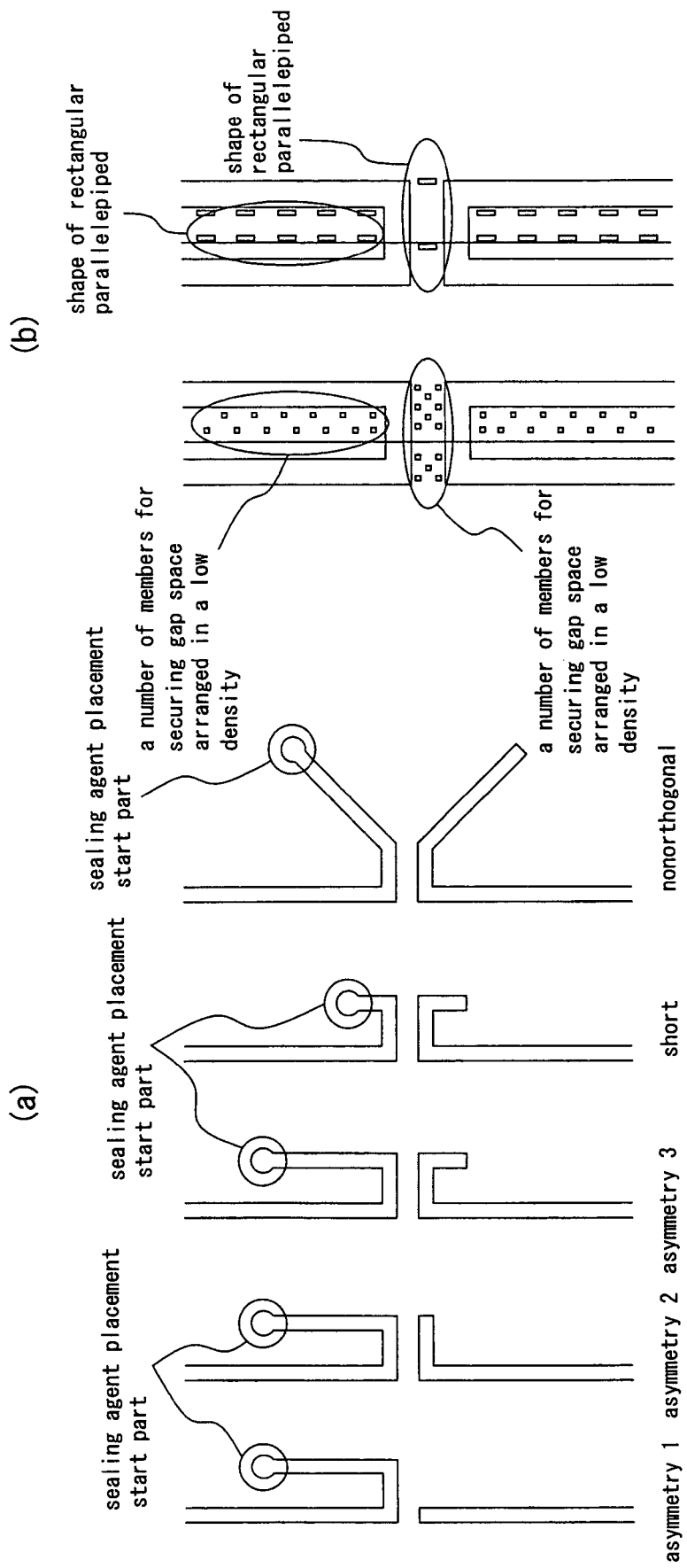
FIG. 17a is a schematic view showing examples of the shape of the arranged sealing agent and FIG. 17b is a schematic view showing examples of the placement of the members for securing the gap space near the opening portion.

FIG. 17a is a schematic view showing examples of the shape of the arranged sealing agent placement part and FIG. 17b is a schematic view showing examples of the placement of the members for securing the gap space near the opening portion 33. The arranged sealing agent placement part may have a asymmetrical shape, or a nonorthogonal shape. A number of members for securing the gap space may be arranged or the member for securing the gap space may have a shape of a rectangular parallelepiped.

When the partition walls of the information display panel are formed, these members for securing the gap space are simultaneously formed. The member for securing the gap space may have a pillar shape such as a cylinder, an ellipse, a triangle pole, a square pole, a hexagonal column and the like and a spherical shape, and not limited to these shapes. When the member is a spherical shape, bead like member having the same diameter may be arranged. The member may have a size such that the member may not seal the opening portion 33 of the arranged sealing agent placement part.

Hereinafter, respective members constituting the information display panel according to the invention will be explained.

As for the substrate, at least one of the substrates (front substrate) is the transparent substrate 2 through which a color of the display media 3 can be observed from outside of the information display panel, and it is preferred to use a material having a high transmission factor of visible light and an excellent heat resistance. The substrate 1 may be transparent or opaque. Examples of the substrate material include polymer sheets such as polyethylene terephthalate, polyethylene naphthalate, polyether sulfone, polyethylene, polycarbonate, polyimide or acryl and metal sheets having flexibility and inorganic sheets such as glass, quartz or the like having no flexibility. The thickness of the substrate is preferably 2 to 5000 mm, more preferably 5 to 2000 mm. When the thickness is too thin, it becomes difficult to maintain strength and distance uniformity between the substrates, and when the thickness is thicker than 5000 mm, it is inconvenient for the thin information display panel.

As for materials for forming the electrodes provided if necessary, metals such as aluminum, silver, nickel, copper, gold and so on, conductive metal oxides such as indium tin oxide (ITO), indium zinc oxide (IZO), aluminium-doped zinc oxide (AZO), indium oxide, conductive tin oxide, antimony tin oxide (ATO) and conductive zinc oxide and so on, and conductive polymer such as polyaniline, polypyrrole, polythiophene and so on are listed and appropriately used. As the method for forming the electrode, the forming method in which a thin film is formed from the above-listed materials by spattering method, vacuum vapor deposition method, CVD (chemical vapor deposition) method, and coating method, the method for laminating a metal film such as a rolled copper film, or the forming method in which the mixed solution of an conductive agent with a solvent or a synthetic resin binder is applied, are used. The electrode disposed on the transparent display substrate 2 should be transparent but the electrode disposed on the back substrate 1 may not be transparent. In both cases, above-mentioned conductive material capable of pattern forming can be preferably used. Additionally, the thickness of the electrode is preferable to be 0.01 to 10 μm, more preferable to be 0.05 to 5 μm so that the electro-conductivity and optical transparency can be maintained. The material and the thickness of the electrode arranged on the back substrate are similar to those of the electrode arranged at the display side, but transparency is not necessary. In this case, the applied outer voltage may be superimposed with a direct current or an alternate current.

As for the partition wall 4 and the frame rib as the member 16 for ensuring the gap space, their shape is suitably designed in accordance with a kind of the display media used for the display, a shape of disposed electrodes and a disposition and is not restricted. It is preferred to set a width of the partition wall to 2-100 mm more preferably 3-50 mm and to set a height of the partition wall to 10-100 mm more preferably 10-50 mm. A height of the frame rib is set to the same as that of the partition wall. In addition, a width of the frame rib is not restricted and is preferably not less than 2 μm.

Moreover, there are a double rib method and single rib method as a method of forming the partition wall on the opposed substrates 1 and 2. In the double rib method ribs are formed on the opposed substrates respectively and then connected with each other. In the single rib method a rib is formed on one of the opposed substrates only. Both methods mentioned above may be preferably applied to the present invention.

Figure 18:
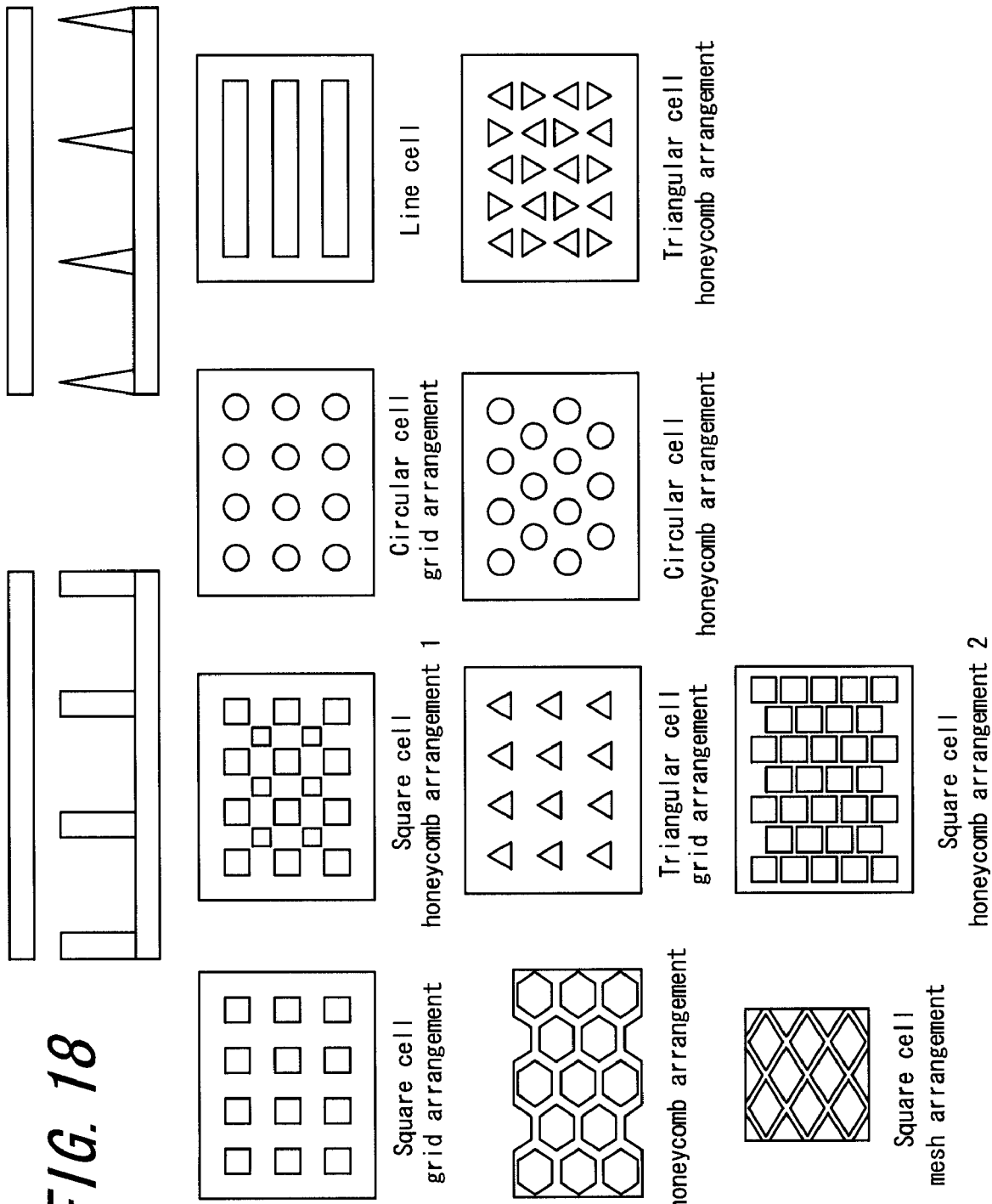
FIG. 18 is a schematic view showing one example of a shape of the partition walls in the information display panel according to the present invention.
Figure 19:
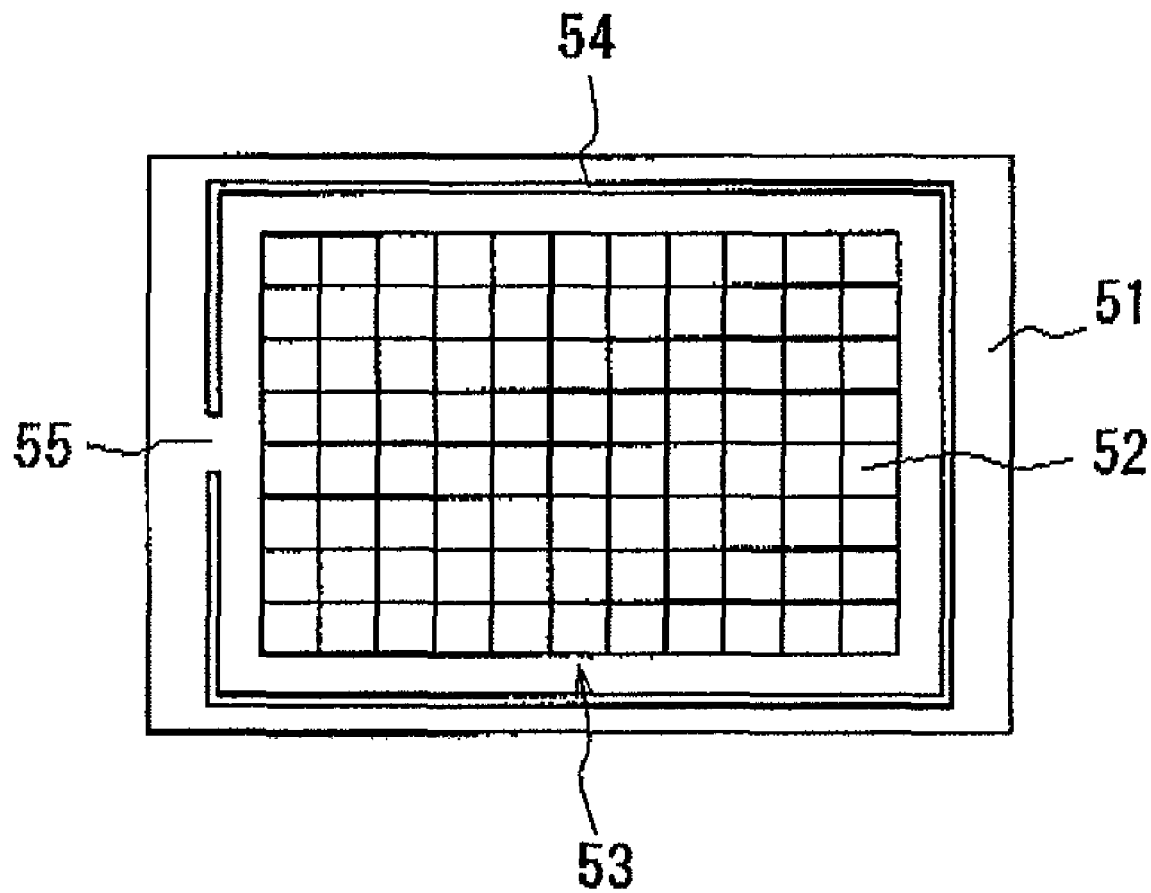
FIG. 19 is a schematic view showing one example of a conventional information display panel.

The cell formed by the partition walls each made of rib has a square shape, a triangular shape, a line shape, a circular shape and a hexagon shape, and has an arrangement such as a grid, a honeycomb and a mesh, as shown in FIG. 18 viewed from a plane surface of the substrate. It is preferred that the portion corresponding to a cross section of the partition wall observed from the display side (an area of the frame portion of the display cell) should be made as small as possible, so that sharpness of the image display can be improved.

As the formation method of the partition wall there are a die transferring method, a screen-printing method, a sandblast method, a photolithography method and an additive method.

Any methods can be preferably used in the information display panel of this invention. Among them, it is preferred to use a photolithography method using a resist film and a die transferring method.

Then, the liquid powders for example used as the display media in the information display panel according to the present invention will be explained. The applicant has the right of the name of the liquid powders utilized in the information display panel of the present invention as "electric liquid powders (trade mark): registration number 4636931".

In the present invention, a term "liquid powders" means an intermediate material having both of liquid properties and particle properties and exhibiting a self-fluidity without utilizing gas force and liquid force. For example, a liquid crystal is defined as an intermediate phase between a liquid and a solid, and has a fluidity showing a liquid characteristic and an anisotropy (optical property) showing a solid characteristic (Heibonsha Ltd.: encyclopedia). On the other hand, a definition of the particle is a material having a finite mass even if it is vanishingly small and receives an attraction of gravity (Maruzen Co., Ltd.: physics subject-book). Here, even in the particles, there are special states such as gas-solid fluidized body and liquid-solid fluidized body. If a gas is flown from a bottom plate to the particles, an upper force is acted with respect to the particles in response to a gas speed. In this case, the gas-solid fluidized body means a state that is easily fluidized when the upper force is balanced with the gravity. In the same manner, the liquid-solid fluidized body means a state that is fluidized by a liquid. (Heibonsha Ltd.: encyclopedia) In the present invention, it is found that the intermediate material having both of fluid properties and solid properties and exhibiting a self-fluidity without utilizing gas force and liquid force can be produced specifically, and this is defined as the liquid powders.

That is, as is the same as the definition of the liquid crystal (intermediate phase between a liquid and a solid), the liquid powder according to the invention is a material showing the intermediate state having both of liquid properties and particle properties, which is extremely difficult to receive an influence of the gravity showing the particle properties mentioned above and indicates a high fluidity. Such a material can be obtained in an aerosol state i.e. in a dispersion system wherein a solid-like or a liquid-like material is floating in a relatively stable manner as a dispersant in a gas, and thus, in the information display panel according to the invention, a solid material is used as a dispersant.

In the information display panel of the present invention, the liquid powders composed of a solid material stably floating as a dispersant for example in a gas and exhibiting a high fluidity in an aerosol state are sealed between two opposed substrates, at least one substrate being transparent. Such liquid powders are too fluid to measure its repose angle, which is an index indicating fluidity of powders and can be made to move easily and stably by means of Coulomb's force and so on generated by applying a low voltage formed by a low voltage application and the like.

As mentioned above, the liquid powders as the display media for example used in the present invention means an intermediate material having both of liquid properties and particle properties and exhibiting a self-fluidity without utilizing gas force and liquid force. Such liquid powders become particularly an aerosol state. In the information display panel according to the invention, the liquid powders are used as the display media in a state such that a solid material is relatively stably floating as a dispersant in a gas.

Then, an example of particles for display (hereinafter, sometimes refer to particles) constituting the display media in the information display panel according to the invention will be explained. The particles for display are used as the display media constructed by only the particles for display, or the display media constructed by mixing them with the other particles, or the display media constructed by controlling them into the liquid powders.

The particles include resin as a main ingredient and, according to need, charge control agent, coloring agent, inorganic additives, as is the same as the known one. Hereinafter, typical examples of resin, charge control agent, coloring agent and other additive will be explained.

Typical examples of the resin include urethane resin, urea resin, acrylic resin, polyester resin, acryl urethane resin, acryl urethane silicone resin, acryl urethane fluorocarbon polymers, acryl fluorocarbon polymers, silicone resin, acryl silicone resin, epoxy resin, polystyrene resin, styrene acrylic resin, polyolefin resin, butyral resin, vinylidene chloride resin, melamine resin, phenolic resin, fluorocarbon polymers, polycarbonate resin, polysulfon resin, polyether resin, and polyamide resin. Two kinds or more of these may be mixed and used. For the purpose of controlling the adherence to the substrate, acryl urethane resin, acryl silicone resin, acryl fluorocarbon polymers, acryl urethane silicone resin, acryl urethane fluorocarbon polymers, fluorocarbon polymers, silicone resin are particularly preferable.

Though charge control agents are not particularly specified to the following examples, examples of the negative charge control agent include salicylic acid metal complex, metal containing azo dye, oil-soluble dye of metal-containing (containing a metal ion or a metal atom), the fourth grade ammonium salt-based compound, calixarene compound, boron-containing compound (benzyl acid boron complex), and nitroimidazole derivative. Examples of the positive charge control agent include nigrosine dye, triphenylmethane compound, the fourth grade ammonium salt-based compound, polyamine resin, imidazole derivatives. Additionally, metal oxides such as ultra-fine particles of silica, ultra-fine particles of titanium oxide, ultra-fine particles of alumina, and so on; nitrogen-containing circular compound such as pyridine, and so on, and these derivates or salts; and resins containing various organic pigments, fluorine, chlorine, nitrogen and the like can be employed as the charge control agent.

As for a coloring agent, various kinds of organic or inorganic pigments or dye with various colors as described below are usable.

Examples of black pigments include carbon black, copper oxide, manganese dioxide, aniline black, activate carbon and the like.

Examples of blue pigments include C.I. pigment blue 15:3, C.I. pigment blue 15, Berlin blue, cobalt blue, alkali blue lake, Victoria blue lake, phthalocyanine blue, metal-free phthalocyanine blue, partially chlorinated phthalocyanine blue, first sky blue, Indanthrene blue BC and the like.

Examples of red pigments include red oxide, cadmium red, diachylon, mercury sulfide, cadmium, permanent red 4R, lithol red, pyrazolone red, watching red, calcium salt, lake red D, brilliant carmine 6B, eosin lake, rhodamine lake B, alizarin lake, brilliant carmine 3B, C.I. pigment red 2 and the like.

Examples of yellow pigments include chrome yellow, zinc chromate, cadmium yellow, yellow iron oxide, mineral first yellow, nickel titanium yellow, navel orange yellow, naphthol yellow S, hansa yellow G, hansa yellow 10G, benzidine yellow G, benzidine yellow GR, quinoline yellow lake, permanent yellow NCG, tartrazinelake, C.I. pigment yellow 12 and the like.

Examples of green pigments include chrome green, chromium oxide, pigment green B, C.I. pigment green 7, Malachite green lake, final yellow green G and the like.

Examples of orange pigments include red chrome yellow, molybdenum orange, permanent orange GTR, pyrazolone orange, Balkan orange, Indanthrene brilliant orange RK, benzidine orange G, Indanthrene brilliant orange GK, C.I. pigment orange 31 and the like.

Examples of purple pigments include manganese purple, first violet B, methyl violet lake and the like.

Examples of white pigments include zinc oxide, titanium oxide, antimony white, zinc sulphide and the like.

Examples of extenders include baryta powder, barium carbonate, clay, silica, white carbon, talc, alumina white and the like. Furthermore, there are Nigrosine, Methylene Blue, rose bengal, quinoline yellow, and ultramarine blue as various dyes such as basic dye, acidic dye, dispersion dye, direct dye, etc.

Examples of inorganic additives include titanium oxide, zinc oxide, zinc sulphide, antimony oxide, calcium carbonate, pearl white, talc, silica, calcium silicate, alumina white, cadmium yellow, cadmium red, cadmium orange, titanium yellow, Berlin blue, Armenian blue, cobalt blue, cobalt green, cobalt violet, ion oxide, carbon black, manganese ferrite black, cobalt ferrite black, copper powder, aluminum powder and the like.

Inorganic additives among these coloring agents may be used alone or in combination with two or more kinds thereof. Particularly, carbon black is preferable as the black coloring agent, and titanium oxide is preferable as the white coloring agent.

The above-mentioned color agents are composed to obtain a certain color of particles for display media.

Moreover, it is preferable to use particles of the present invention, whose average particle diameter d(0.5) ranges between 1 to 20 mm and which are even. If the average particle diameter d(0.5) exceeds this range, the image sharpness is sometimes deteriorated, and, if the average particle diameter is smaller than this range, an agglutination force between the particles becomes too large to prevent the movement of the particles.

Further, in the particles for display used in the present invention, as for the particle diameter distribution, the particle diameter distribution Span, which is defined by the following formula, is less than 5 preferably less than 3:

$$\text{Span} = (d(0.9) - d(0.1))/d(0.5)$$

(here, d(0.5) means a value of the particle diameter expressed by mm wherein an amount of the particles having the particle size larger than or smaller than this value is 50%, d(0.1) means a value of the particle diameter expressed by mm wherein an amount of the particles having the particle size smaller than this value is 10%, and d(0.9) means a value of the particle size expressed by mm wherein an amount of the particles having the particle size smaller than this value is 90%).

When the Span is set to no more than 5, each particle has similar particle diameter to perform an even movement as the display media.

Furthermore, as for a correlation between each particles for display, it is crucial to set a ratio of d(0.5) of the particles having smallest diameter with respect to d(0.5) of the particles having largest diameter to not more than 50 preferably not more than 10. Even if the particle diameter distribution Span is made smaller, the particles having different charge properties with each other are moved in the opposite direction. Therefore, it is preferred that the particle diameters are formed closely with each other and equivalent amounts of the particles are easily moved in the opposite direction. To this end, the above range is obtained.

Here, the particle diameter distribution and the particle diameter mentioned above can be measured by means of a laser diffraction/scattering method. When a laser light is incident upon the particles to be measured, a light intensity distribution pattern due to a diffraction/scattering light occurs spatially. This light intensity distribution pattern corresponds to the particle diameter, and thus it is possible to measure the particle diameter and the particle diameter distribution.

In the present invention, the particle diameter and the particle diameter distribution are obtained by a volume standard distribution. Specifically, the particle diameter and the particle diameter distribution can be measured by means of a measuring apparatus Mastersizer 2000 (Malvern Instruments Ltd.) wherein the particles setting in a nitrogen gas flow are calculated by an installed analysis software (which is based on a volume standard distribution due to Mie's theory).

A charge amount of the particle for display properly depends upon the measuring condition. However, it has been found that the charge amount of the particle for display in the information display panel substantially depends upon an initial charge amount, a contact with respect to the partition walls, a contact with respect to the substrates, a charge decay due to an elapsed time, and specifically a saturation value of the particles for display during a charge behavior is a main factor.

After various investigations by the inventors, it is found that an adequate range of the charged values of the particles for display can be estimated by performing a blow-off method utilizing the same carrier particles so as to measure the charge amount of the particles for display.

Further, when the information display panel according to the present invention is used as a dry type information display panel, in which the display media is driven in a gas space, it is important to control a gas surrounding the display media in a gap between the substrates, and a suitable gas control contributes an improvement of display stability. Specifically, it is important to set the relative humidity of the gas in the gap not more than 60% RH at 25° C., preferably not more than 50% RH.

The above gap means a gas portion surrounding the display media obtained by substituting occupied portions of the electrodes 5, 6 (in the case of arranging the electrodes inside the substrates), the display media 3 (particles or liquid particles), the partition walls 4 and a seal portion of the information display panel from the space between the opposed substrates 1 and 2 shown in FIGS. 1a, 1b to 3a, 3b.

A kind of the gas in the space is not limited as long as it has the humidity mentioned above, but it is preferred to use dry air, dry nitrogen gas, dry argon gas, dry helium gas, dry carbon dioxide gas, dry methane gas and so on. It is necessary to seal this gas in the information display panel so as to maintain the humidity mentioned above. For example, it is important to perform the operations of filling the display media and assembling the information display panel under an atmosphere having a predetermined humidity and to apply a seal member and a seal method for preventing a humidity inclusion from outside.

In the information display panel of the invention, the gap between the substrates may be adjusted so that the display media can be moved to maintain the contrast. The gap is adjusted normally to 10-500 mm, preferably 10-200 mm.

In the case of the dry type information display panel, the volume occupied rate of the display media in a space of the gas between the opposed substrates is preferably 5-70%, more preferably 5-60%. If the volume occupied rate of the display media exceeds 70%, the display media may become difficult to move, and if it is less than 5%, a sufficient contrast cannot be obtained and a sharp image display is not performed.

EXAMPLES

Hereinafter, experimental examples will be described. In the following examples, although adhesive (sealant) is applied and arranged by means of a dispenser, adhesive (sealant) arranging units other than a dispenser may be used. In addition, adhesive (sealant) arranged in another area in advance can be copied and arranged.

Example 1

Ultraviolet cure adhesive (sealant) composed of acrylate oligomer of 70% by weight, 2-hydroxyethyl methacrylate of 25% by weight, and photo polymerization initiator of 2% by weight and Silica particles of 3% by weight was prepared as adhesive (sealant) A. Viscosity of the ultraviolet cure adhesive (sealant) was 23 Pa·s measured by a B-type viscometer in 20 rotations and shrinkage ratio in curing was 5%. This adhesive (sealant) was applied to the opening portion by a dispenser under an atmosphere pressure, hold in one minute and cured by LED (Matsushita Electric Works, Ltd., ANUJ5010) emitting an ultraviolet ray with a irradiance level of 3000 mJ/cm². The temperature of the irradiated part was 56 degree C. No peeling was found, the average depth of penetration was 1.2 mm and good result was obtained.

Example 2

The above adhesive (sealant) A was applied to a stainless-steel block (jig) having a cross-section area of 1.5 mm×5 mm under an atmosphere pressure. The adhesive (sealant) A was applied to the opening portion by contacting this jig to the opening portion, hold in one minute and cured by LED emitting an ultraviolet ray with a irradiance level of 3000 mJ/cm². The temperature of the irradiated part was 56 degree C. No peeling was found, the average depth of penetration was 1.1 mm and good result was obtained.

Example 3

The above adhesive (sealant) A was applied to a stainless-steel block (jig) having a cross-section area of 1.5 mm×5 mm under a pressure less than the atmosphere pressure by 0.3 kPa. The adhesive (sealant) A was applied to the opening portion by contacting this jig to the opening portion, hold in one minute and cured by LED emitting an ultraviolet ray with a irradiance level of 3000 mJ/cm². The temperature of the irradiated part was 56 degree C. No peeling was found, the average depth of penetration was 1.4 mm and good result was obtained.

Example 4

Ultraviolet cure adhesive (sealant) composed of acrylate oligomer of 58% by weight, 2-hydroxyethyl methacrylate of 37% by weight, and photo polymerization initiator of 2% by weight and Silica particles of 3% by weight was prepared as adhesive (sealant) B. Viscosity of the ultraviolet cure adhesive (sealant) was 10 Pa·s measured by a B-type viscometer in 20 rotations and shrinkage ratio in curing was 2%. This adhesive (sealant) was applied to the opening portion by a dispenser under an atmosphere pressure, hold in one minute and cured by LED emitting an ultraviolet ray with a irradiance level of 3000 mJ/cm². The temperature of the irradiated part was 56 degree C. No peeling was found, the average depth of penetration was 1.6 mm and good result was obtained.

Example 5

Ultraviolet cure adhesive (sealant) composed of acrylate oligomer of 73% by weight, 2-hydroxyethyl methacrylate of 22% by weight, and photo polymerization initiator of 2% by weight and Silica particles of 3% by weight was prepared as adhesive (sealant) C. Viscosity of the ultraviolet cure adhesive (sealant) was 28 Pa·s measured by a B-type viscometer in 20 rotations and shrinkage ratio in curing was 7%. This adhesive (sealant) was applied to the opening portion by a dispenser under an atmosphere pressure, hold in one minute and cured by LED emitting an ultraviolet ray with a irradiance level of 3000 mJ/cm². The temperature of the irradiated part was 56 degree C. No peeling was found, the average depth of penetration was 1.2 mm and good result was obtained.

Example 6

Ultraviolet cure adhesive (sealant) composed of acrylate oligomer of 70% by weight, 2-hydroxyethyl methacrylate of 15% by weight, and photo polymerization initiator of 2% by weight and Silica particles of 13% by weight was prepared as adhesive (sealant) D. Viscosity of the ultraviolet cure adhesive (sealant) was 45 Pa·s measured by a B-type viscometer in 20 rotations and shrinkage ratio in curing was 4%. This adhesive (sealant) was applied to the opening portion by a dispenser under an atmosphere pressure, hold in one minute and cured by LED emitting an ultraviolet ray with a irradiance level of 3000 mJ/cm². The temperature of the irradiated part was 56 degree C. No peeling was found, the average depth of penetration was 0.8 mm and good result was obtained.

Example 7

Ultraviolet cure adhesive (sealant) No. 3052 (2-hydroxyethyl methacrylate of 30% by weight) produced by ThreeBond Co., Ltd. was prepared as adhesive (sealant) E. Viscosity of the ultraviolet cure adhesive (sealant) was 10 Pa·s measured by a B-type viscometer in 20 rotations and shrinkage ratio in curing was 8%. This adhesive (sealant) was applied to the opening portion by a dispenser under an atmosphere pressure, hold in one minute and cured by LED emitting an ultraviolet ray with a irradiance level of 3000 mJ/cm². The temperature of the irradiated part was 56 degree C. No peeling was found, the average depth of penetration was 1.6 mm and good result was obtained.

Comparative Example 1

Ultraviolet cure adhesive (sealant) composed of acrylate oligomer of 20% by weight, 2-hydroxyethyl methacrylate of 75% by weight, and photo polymerization initiator of 2% by weight and Silica particles of 3% by weight was prepared as adhesive (sealant) F. Viscosity of the ultraviolet cure adhesive (sealant) was 2.0 Pa·s measured by a B-type viscometer in 20 rotations and shrinkage ratio in curing was 5%. This adhesive (sealant) was applied to the opening portion by a dispenser under an atmosphere pressure, hold in one minute and cured by LED (Matsushita Electric Works, Ltd., ANUJ5010) emitting an ultraviolet ray with a irradiance level of 3000 mJ/cm².

The temperature of the irradiated part was 56 degree C. No peeling was found, the average depth of penetration was 2.5 mm and the result showed bad influence on a part of the image display area.

Comparative Example 2

Ultraviolet cure adhesive (sealant) composed of acrylate oligomer of 90% by weight, 2-hydroxyethyl methacrylate of 5% by weight, and photo polymerization initiator of 2% by weight and Silica particles of 3% by weight was prepared as adhesive (sealant) G. Viscosity of the ultraviolet cure adhesive (sealant) was 55 Pa·s measured by a B-type viscometer in 20 rotations and shrinkage ratio in curing was 7%. This adhesive (sealant) was applied to the opening portion by a dispenser under an atmosphere pressure, hold in one minute and cured by LED (Matsushita Electric Works, Ltd., ANUJ5010) emitting an ultraviolet ray with a irradiance level of 3000 mJ/cm$^2$. The temperature of the irradiated part was 56 degree C. No peeling was found, the average depth of penetration was 0.2 mm, which was insufficient.

Comparative Example 3

Ultraviolet cure adhesive (sealant) composed of acrylate oligomer of 60% by weight, neopentyl glycol diacrylate of 35% by weight, and photo polymerization initiator of 2% by weight and Silica particles of 3% by weight was prepared as adhesive (sealant) H. Viscosity of the ultraviolet cure adhesive (sealant) was 15 Pa·s measured by a B-type viscometer in 20 rotations and shrinkage ratio in curing was 12%. This adhesive (sealant) was applied to the opening portion by a dispenser under an atmosphere pressure, hold in one minute and cured by LED (Matsushita Electric Works, Ltd., ANUJ5010) emitting an ultraviolet ray with a irradiance level of 3000 mJ/cm$^2$. The temperature of the irradiated part was 56 degree C. Peeling was found after irradiating UV light.

The information display panel according to the invention is preferably applicable to portable information devices such as notebook personal computers, electronic databooks, PDAs (Personal Digital Assistants), to the display unit for mobile equipments such as, cellular phones, handy terminals and so on; to the electric papers such as electric books, electric newspapers and so on; to the bulletin boards such as signboards, posters, blackboards (whiteboards) and so on; to the display unit for electric calculators, home electric application products, auto supplies and so on; to the card display unit such as point cards, IC cards and so on; and to the display unit for electric advertisements, information boards, electric POPs (Point of Presence, Point of Purchase advertising), electric price tags, electric shelf tags, electric musical scores, RF-ID devices and so on. In addition, the information display panel according to the invention is preferably used in the display units for POS terminals, car navigation systems, clocks and other various electric devices. Besides, the information display panel according to the invention is preferably used in a rewritable paper, wherein display is rewritten by means of external electric field forming means.

As a driving method of the information display panel according to the invention, there are various types of drive systems such as passive matrix drive system and static drive system, by which a panel itself doesn't have switching elements, active matrix system, by which a panel has three-terminal switching elements represented by a thin-film transistor (TFT) or two-terminal switching elements represented by a thin-film diode (TFD), and external electric field drive system using external electric field forming means.

What is claimed is:

1. An information display panel of the present invention, wherein display media consisting of at least one kind of particle and having optical reflectance and charging characteristics are sealed between two opposed substrates, at least one of which is transparent, wherein the display media, to which an electrostatic field is applied, are made to move so as to display information such as an image or the like, and wherein, in the outer and inner peripheral sides of a sealing agent placement part provided in an outer edge portion of an information display area of the information display panel to seal a gap between one substrate and the other substrate, a member for securing a gap space is formed, comprising the construction such that the member for securing the gap space provided in the outer peripheral side of the sealing agent placement part is provided evenly in each side and densely in each corner portion, and the member for securing the gap space provided in the inner peripheral side of the sealing agent placement part is provided with its chamfered corners in each corner portion.

2. The information display panel according to claim 1, wherein the member for securing the gap space provided in the inner peripheral side of the sealing agent placement part has a chamfered shape, a step like shape or an arched shape.

3. The information display panel according to claim 1, wherein a sealing agent arranged in the sealing agent placement part provided in the outer edge portion of the information display area on one substrate has at least one opening portion, which is used as a hole to allow gas to escape in attaching the other substrate and sealed by means of an ultraviolet cure adhesive.

4. The information display panel according to claim 3, wherein the ultraviolet cure adhesive is composed of acrylate oligomer, 2-hydroxyethyl methacrylate, and photo polymerization initiator with a ratio of 2-hydroxyethyl methacrylate being within a range between 20 and 40% by weight.

5. The information display panel according to claim 3, wherein viscosity of the ultraviolet cure adhesive is within a range between 3.0 and 50 Pa·s measured by a B-type viscometer in 20 rotations and that shrinkage ratio in curing is not more than 10%.

6. The information display panel according to claim 3, wherein, under an atmosphere pressure or a reduced pressure less than the atmosphere pressure by 0.1 kPa-0.5 kPa, a given amount of the ultraviolet cure adhesive is applied to the opening portion to penetrate and is cured by illuminating an ultraviolet ray from an ultraviolet ray irradiating device.

7. The information display panel according to claim 6, wherein, as the ultraviolet ray irradiating device, a LED emanating an ultraviolet ray is used and the ultraviolet cure adhesive is cured at a low temperature not more than 70 degree C.

8. The information display panel according to claim 3, wherein, under an atmosphere pressure or a reduced pressure less than the atmosphere pressure by 0.1 kPa-0.5 kPa, a given amount of the ultraviolet cure adhesive is applied to the opening portion by means of a dispenser to penetrate and is cured by illuminating an ultraviolet ray from an ultraviolet ray irradiating device.

9. The information display panel according to claim 3, wherein, under an atmosphere pressure or a reduced pressure less than the atmosphere pressure by 0.1 kPa-0.5kPa, a jig, to which a given amount of the ultraviolet cure adhesive applied in advance, is contacted to the opening portion so that the ultraviolet cure adhesive is applied and penetrated into the opening portion and is cured by irradiating an ultraviolet ray from an ultraviolet ray irradiating device.

10. The information display panel according to claim 1, wherein, when the opening portion is provided in a part of the sealing agent arranged in the sealing agent placement part, at least a sealing agent placement start part, which is one end of the sealing agent arranged in the sealing agent placement part, extends to a location away from the opening provided in a part of the sealing agent arranged in the sealing agent placement part, and the member for securing the gap space is provided in the neighborhood of the opening portion.

11. The information display panel according to claim 10, wherein both a sealing agent placement start part and a sealing agent placement end part, which are ends of the sealing agent arranged in the sealing agent placement part, extend to a location away from the opening provided in a part of the sealing agent arranged in the sealing agent placement part, and the member for securing the gap space is provided in the neighborhood of the opening portion.

12. The information display panel according to claim 10, wherein, when the member for securing the gap space is arranged in the opening portion and seal corner parts, the member for securing the gap space having a small area pattern is arranged.

13. The information display panel according to claim 10, wherein, when the member for securing the gap space is arranged in a part surrounded by the sealing agent arranged in the sealing agent placement part, the member for securing the gap space having a small area pattern is arranged in low density.

14. A mother panel of the information display panel formed in such a manner that two mother sheet substrates used for producing at least one of the information display panel according to claim 10 are attached.

* * * * *